US012513098B2

(12) United States Patent
Smetanin et al.

(10) Patent No.: US 12,513,098 B2
(45) Date of Patent: Dec. 30, 2025

(54) STICKER SEARCH ICON PROVIDING DYNAMIC PREVIEWS

(71) Applicant: Snap Inc., Santa Monica, CA (US)

(72) Inventors: Sergey Smetanin, London (GB); Dor Ayalon, Glasgow (GB); Vladimir Gordienko, London (GB); Roman Golobokov, London (GB); Ivan Babanin, London (GB); Timur Zakirov, London (GB); Nikita Demidov, London (GB); Aleksandr Larionov, London (GB); Anna Kovalenko, London (GB); Nikita Belosludtcev, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/209,130

(22) Filed: Jun. 13, 2023

(65) Prior Publication Data

US 2024/0422113 A1 Dec. 19, 2024

(51) Int. Cl.
*H04L 51/10* (2022.01)
*G06F 3/04817* (2022.01)
*H04L 51/046* (2022.01)
*H04L 51/52* (2022.01)

(52) U.S. Cl.
CPC .......... *H04L 51/10* (2013.01); *G06F 3/04817* (2013.01); *H04L 51/046* (2013.01); *H04L 51/52* (2022.05)

(58) Field of Classification Search
CPC ....... H04L 51/10; H04L 51/046; H04L 51/52; G06F 3/04817
See application file for complete search history.

(56) References Cited

U.S. PATENT DOCUMENTS

| 5,604,843 A | 2/1997 | Shaw et al. |
|---|---|---|
| 5,689,559 A | 11/1997 | Park |
| 5,880,731 A | 3/1999 | Liles et al. |

(Continued)

FOREIGN PATENT DOCUMENTS

| CN | 109863532 | 6/2019 |
|---|---|---|
| CN | 110168478 | 8/2019 |

(Continued)

OTHER PUBLICATIONS

U.S. Appl. No. 18/183,794, filed Mar. 14, 2023, Techiques for Recommending Reply Stickers.

(Continued)

*Primary Examiner* — Hua Fan
(74) *Attorney, Agent, or Firm* — Schwegman Lundberg & Woessner, P.A.

(57) ABSTRACT

Examples described herein relate to techniques for facilitating selection of stickers for inclusion in messages within the context of an interaction system. According to some examples, message content is detected and a set of candidate stickers is identified based on the message content. A search icon is dynamically replaced with a representation of respective ones of the set of candidate stickers. At a first point in time, the search icon represents a first candidate sticker of the set of candidate stickers. At a second point in time, the search icon represents a second candidate sticker of the set of candidate stickers.

20 Claims, 17 Drawing Sheets

(56) References Cited

U.S. PATENT DOCUMENTS

| | | |
|---|---|---|
| 6,023,270 A | 2/2000 | Brush, II et al. |
| RE36,919 E | 10/2000 | Park |
| RE37,052 E | 2/2001 | Park |
| 6,223,165 B1 | 4/2001 | Lauffer |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,659,405 B1 * | 5/2020 | Chang ............... G06F 3/04817 |
| 10,762,174 B2 | 9/2020 | Denton et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,063,891 B2 | 7/2021 | Voss |
| 11,069,103 B1 | 7/2021 | Blackstock et al. |
| 11,080,917 B2 | 8/2021 | Monroy-hernández et al. |
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-Hernández et al. |
| 11,284,144 B2 | 3/2022 | Kotsopoulos et al. |
| 11,502,983 B2 | 11/2022 | Heikkinen et al. |
| 12,149,489 B2 | 11/2024 | Golobokov et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |

(56) References Cited

U.S. PATENT DOCUMENTS

| | | |
|---|---|---|
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0125811 A1 | 5/2010 | Moore et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0046423 A1 | 2/2015 | Weeks |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0039406 A1 | 2/2018 | Kong et al. |
| 2018/0047200 A1 | 2/2018 | O'hara et al. |
| 2018/0083898 A1* | 3/2018 | Pham .................. H04L 51/046 |
| 2018/0113587 A1 | 4/2018 | Allen et al. |
| 2018/0115503 A1 | 4/2018 | Baldwin et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0097958 A1 | 3/2019 | Collet et al. |
| 2019/0188920 A1 | 6/2019 | Mcphee et al. |
| 2019/0280997 A1 | 9/2019 | Baldwin et al. |
| 2019/0286648 A1 | 9/2019 | Wan et al. |
| 2020/0259948 A1 | 8/2020 | Keohane et al. |
| 2020/0306637 A1 | 10/2020 | Baldwin et al. |
| 2020/0372127 A1 | 11/2020 | Denton et al. |
| 2020/0410575 A1 | 12/2020 | Grantham et al. |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0383251 A1 | 12/2021 | Osborn et al. |
| 2021/0385179 A1* | 12/2021 | Heikkinen .............. H04L 51/52 |
| 2021/0385180 A1 | 12/2021 | Al Majid et al. |
| 2021/0397645 A1* | 12/2021 | Wang .................. G06F 3/04847 |
| 2021/0405831 A1 | 12/2021 | Mourkogiannis et al. |
| 2021/0409535 A1 | 12/2021 | Mourkogiannis et al. |
| 2022/0012929 A1 | 1/2022 | Blackstock et al. |
| 2022/0269354 A1 | 8/2022 | Prasad et al. |
| 2022/0269733 A1 | 8/2022 | Li et al. |
| 2022/0337540 A1* | 10/2022 | Bayer .................. G06F 3/0236 |
| 2024/0314091 A1 | 9/2024 | Golobokov et al. |
| 2024/0419295 A1 | 12/2024 | Smetanin et al. |
| 2025/0055818 A1 | 2/2025 | Golobokov et al. |

FOREIGN PATENT DOCUMENTS

| | | |
|---|---|---|
| EP | 2184092 | 5/2010 |
| JP | 2001230801 | 8/2001 |
| JP | 5497931 | 3/2014 |
| KR | 101445263 | 9/2014 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |

OTHER PUBLICATIONS

U.S. Appl. No. 18/209,144, filed Jun. 13, 2023, Sticker Search Icon With Multiple States.

"U.S. Appl. No. 18/183,794, Non Final Office Action mailed Sep. 19, 2023", 12 pgs.

"U.S. Appl. No. 18/183,794, Response filed Nov. 3, 2023 to Non Final Office Action mailed Sep. 19, 2023", 12 pgs.

"U.S. Appl. No. 18/183,794, Final Office Action mailed Jan. 8, 2024", 13 pgs.

"U.S. Appl. No. 18/183,794, Final Office Action mailed May 31, 2024", 7 pgs.

"U.S. Appl. No. 18/183,794, Non Final Office Action mailed Mar. 12, 2024", 14 pgs.

"U.S. Appl. No. 18/183,794, Response filed Jan. 30, 2024 to Final Office Action mailed Jan. 8, 2024", 14 pgs.

"U.S. Appl. No. 18/183,794, Response filed May 6, 2024 to Non Final Office Action mailed Mar. 12, 2024", 12 pgs.

"U.S. Appl. No. 18/183,794, Response filed Jun. 13, 2024 to Final Office Action mailed May 31, 2024", 11 pgs.

"U.S. Appl. No. 18/209,144, Non Final Office Action mailed Jun. 17, 2024", 17 pgs.

"U.S. Appl. No. 18/183,794, Notice of Allowance mailed Jul. 11, 2024", 7 pgs.

"U.S. Appl. No. 18/209,144, Response filed Sep. 17, 2024 to Non Final Office Action mailed Jun. 17, 2024", 10 pgs.

"U.S. Appl. No. 18/209,144, Final Office Action mailed Dec. 12, 2024", 17 pgs.

"U.S. Appl. No. 18/209,144, Examiner Interview Summary mailed Jan. 31, 2025", 2 pgs.

"U.S. Appl. No. 18/209,144, Response filed Feb. 7, 2025 to Final Office Action mailed Dec. 12, 2024", 11 pgs.

"U.S. Appl. No. 18/209,144, Non Final Office Action mailed Feb. 28, 2025", 17 pgs.

(56) References Cited

OTHER PUBLICATIONS

"U.S. Appl. No. 18/209,144, Examiner Interview Summary mailed May 14, 2025", 2 pgs.

"U.S. Appl. No. 18/209,144, Response filed May 27, 2025 to Non Final Office Action mailed Feb. 28, 2025", 9 pgs.

"Bitmoji Customize text", [Online] Retrieved from the Internet: URL: https: web.archive.org web 20210225200456 https: support.bitmoji.com hc en-us articles 360034632291-Customize-Text-on-Bitmoji-Stickers, (captured Feb. 25, 2021), 3 pgs.

"Bitmoji Chrome Extension", [Online] Retrieved from the Internet: URL: https: web.archive.org web 20200919024925 https: support.bimoji.com hc en-us articles 360001494066, (Sep. 19, 2020), 5 pgs.

"Bitmoji", Snapchat Support, [Online] Retrieved from the Internet: URL: https: web.archive.org web 20190503063620 https: support.snapchat.com en-US a bitmoji, (captured May 3, 2019), 2 pgs.

"Manage Your Bitmoji", Snapchat Support, [Online] Retrieved from the Internet: URL: https: web.archive.org web20190503063620 https: support.snapchat.com en-US a manage-bitmoji, (captured May 3, 2019), 3 pgs.

"Bitmoji Family", Snapchat Support, [Online] Retrieved from the Internet: URL: https: web.archive.org web20190503063620 https: support.snapchat.com en-US article bitmoji-family, (captured May 3, 2019), 4 pgs.

"Your Own Personal Emoji", Bitstrips Inc, [Online] Retrieved from the Internet: URL: https: web.archive.org web20150205232004 http: bitmoji.com , (captured Feb. 5, 2015), 3 pgs.

"Instant Comics Starring You and Your Friends", Bitstrips Inc, [Online] Retrieved from the Internet: URL: https: web.archive.org web 20150206000940 http: company.bitstrips.com bitstrips-app.html, (captured Feb. 6, 2015), 3 pgs.

Carnahan, Daniel, "Snap is Offering Personalized Video Content Through Bitmoji TV", Business Insider, [Online] Retrieved from the Internet: URL: https: www.businessinsider.com snap-offers-personalized-video-content-through-bitmoji-tv-2019-12, (2019), 10 pgs.

Constine, Josh, "Snapchat launches Bitmoji merch and comic strips starring your avatar", TechCrunch, [Online] Retrieved from the Internet: URL: https: techcrunch.com 2018 11 13 bitmoji-store , (Nov. 13, 2018), 16 pgs.

Constine, Josh, "Snapchat Launches Bitmoji TV: Zany 4-min Cartoons of Your Avatar", TechCrunch, [Online] Retrieved from the Internet: URL: https: techcrunch.com 2020 01 30 bitmoji-tv , (Jan. 30, 2020), 13 pgs.

Kuhn, Steve, "How to Send Stickers on Snapchat?", ITGeared, [Online]. Retrieved from the Internet: URL: https:www.itgeared.com how-to-send-stickers-on-snapchat , (Aug. 31, 2022), 6 pgs.

MacMillan, Douglas, "Snapchat Buys Bitmoji App for More Than $100 Million", The Wallstreet Journal, [Online] Retrieved from the Internet: URL: https: www.wsj.com articles snapchat-buys-bitmoji-app-for-more-than-100-million-1458876017, (Mar. 25, 2016), 5 pgs.

Newton, Casey, "Your Snapchat friendships now have their own profiles—and merchandise", The Verge, [Online] Retrieved from the Internet: URL: https: www.theverge.com 2018 11 13 18088772 snapchat-friendship-profiles-bitmoji-merchandise-comics, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: URL: https: www.theverge.com 2018 1 30 16949402 bitmoji-deluxe-snapchat-customization, (Jan. 30, 2018), 2 pgs.

Reign, Ashley, "How to Add My Friend's Bitmoji to My Snapchat", Women.com, [Online] Retrieved from the Internet: URL: https: www.women.com ashleyreign lists how-to-add-my-friends-bitmoji-to-my-snapchat, (Jun. 30, 2017), 7 pgs.

Tumbokon, Karen, "Snapchat Update: How to Add Bitmoji to Customizable Geofilters", International Business Times, [Online] Retrieved from the Internet : URL: https: www.ibtimes.com snapchat-update-how-add-bitmoji-customizable-geofilters-2448152, (Nov. 18, 2016), 6 pgs.

\* cited by examiner

STICKER SEARCH ICON PROVIDING DYNAMIC PREVIEWS

TECHNICAL FIELD

The present disclosure relates to techniques for facilitating selection of stickers in the context of an interaction system that provides a messaging application or service.

BACKGROUND

Advances in a variety of computer-related technologies have given rise to several online or Internet-based interaction applications that provide messaging functionality. Traditional messaging systems and applications, such as e-mail or conventional text messaging, are quickly being replaced or supplemented with new messaging applications that provide for generating and communicating with rich content—e.g., content that incorporates a variety of different media formats, including text, audio, graphics, images, animations, photographs, video, augmentations, and/or effects. One media format that has become increasingly popular is the digital sticker, more frequently referred to simply as a sticker.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
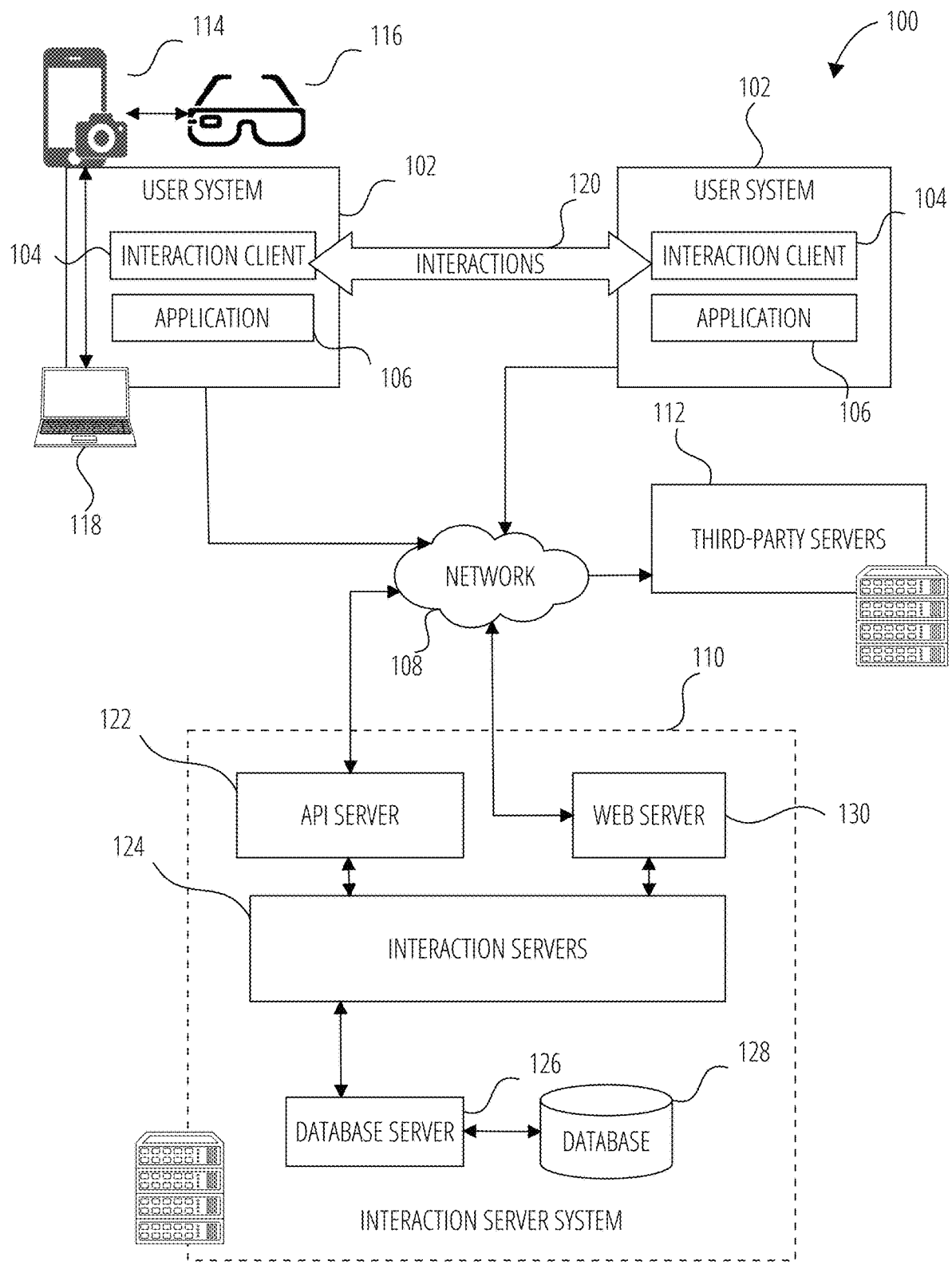
FIG. 1 is a diagrammatic representation of a networked environment in which the present disclosure may be deployed, according to some examples.

For purposes of the present disclosure, the terms "message" and "media content item" are used synonymously. As will be readily apparent from the description of the various figures that follow, a message or media content item may consist of one or various component parts—that is, individual content items, including, for example, text, audio, graphics, images, animations, photographs, video, augmentations, and/or effects. Interaction applications can provide for the exchange of messages in both a one-to-one (e.g., direct messaging) context, as well as a one-to-many context. In the case of one-to-many messaging, an interaction application may allow a sending user to specify or select multiple receiving users to receive a message (or, in the case of a messaging group, messages may automatically be delivered to multiple receiving users).

A sticker is a graphic, icon, or image, similar in concept to an emoji. However, while a set of stickers supported by an interaction system may include emojis, the concept of a "sticker" is broader in the sense that many stickers do not correspond with and represent a predetermined symbol. For instance, whereas emojis may be part of a standardized character coding system (e.g., the Unicode Standard), the majority of stickers generally are not part of any standardized character coding system.

Implementations of sticker systems may provide greater flexibility in creating diverse and meaningful content (e.g., through customized or personalized stickers) that can be more expressive and engaging than conventional characters or emojis. Given that a sticker system utilized by an interaction application may include considerably more stickers than any conventional emoji set, it may be challenging for a sending user to identify an appropriate sticker, or quickly select a desired sticker, when composing a message to be communicated with one or more receiving users.

In creating a message, whether it be a direct message or a one-to-many message posted to a content feed, to a group of users, or to a content collection (e.g., a "story"), content creators may add to the content of the message one or more stickers (in some cases, the message content consists exclusively of a sticker). Typically, the stickers are maintained and managed by a sticker system that is part of, or otherwise associated with, the interaction application. In some instances, a sticker may be customized or personalized, for instance, to reflect characteristics of the content creator. For example, a sticker may comprise an avatar that has been configured by a user to convey a likeness of the user. As another example, a sticker may be an animated graphic that includes attributes of the user (e.g., the head of the user added to a predefined animation). Similarly, a sticker may be customized to reflect an attribute or characteristic of a location from which a message is being created and shared, or an event occurring at the time the message is being created and shared. Accordingly, customized and/or personalized stickers help content creators better to convey their message and improve overall engagement.

When a user of an interaction application accesses a messaging interface (e.g., opens a chat window, previews or edits a media content item to be shared with one or more receiving users, or initiates a reply message), a user-specific sticker may be presented to provide a call to action (CTA) linked to a sticker search function of the interaction application. Selection of the sticker search icon may cause presentation of a sticker search panel (e.g., a "sticker drawer" or "sticker picker") that displays stickers by sticker category. Finding the right sticker can be tedious and time-consuming, requiring the user to navigate multiple pages or tabs with information. This can be distracting and discouraging for users to implement stickers in their communications, which may result in wasted resources or time.

Examples described in the present disclosure provide a messaging interface that includes a sticker search icon which provides dynamic sticker previews to address technical challenges identified herein. The messaging interface may be any interface that enables a user to compose a message, such as a conversation interface (also known as a "chat" interface). The sticker search icon provides a dynamic preview of a set of stickers, referred to as candidate stickers, available for selection by the user. In some examples, the appearance of the sticker search icon is dynamically updated to cycle through the candidate stickers, one after another, enabling the user to view, at a top level of the messaging interface, several previews of the most relevant stickers (or potentially relevant stickers). The relevant stickers may include stickers of different sticker categories (e.g., different sticker types, such as avatar stickers, user-created stickers, location-based stickers, or animated stickers, such as Graphics Interchange Format (GIF) stickers). Further, the sticker search icon may be user-selectable to access the candidate stickers.

According to some examples, message content is detected and a set of candidate stickers is identified based on the message content. A search icon is dynamically replaced with a representation of respective ones of the set of candidate stickers. At a first point in time, the search icon represents a first candidate sticker of the set of candidate stickers. At a second point in time, the search icon represents a second candidate sticker of the set of candidate stickers.

According to some examples, a method includes causing presentation of a messaging interface which includes a user-selectable search icon. The method includes detecting first user input that comprises message content (e.g., text content), and automatically identifying a set of candidate stickers based on the message content. Detecting the message content or first user input may include detecting addition of the message content to an input field of the messaging interface by a sending user, or detecting transmission of a message comprising the message content, via the messaging interface, from the sending user to at least one receiving user.

The method may include causing dynamic updating of an appearance of the search icon within the messaging interface, such that respective candidate stickers from the set of candidate stickers are each presented as the search icon, one after another, and each for a predetermined period of time (e.g., 1 second, 2 seconds, 3 seconds, 4 seconds, or 5 seconds). Responsive to receiving second user input to select the search icon, the interaction application may cause presentation, within the messaging interface, of a sticker search graphical element (e.g., a search panel) that presents one or more of the candidate stickers. Each of the one or more candidate stickers presented by the sticker search graphical element may be user selectable to include the candidate sticker in a message.

The candidate stickers may correspond to sticker search results. For example, based on text entered within an input field of the messaging interface, or based on text of a message sent by a sending user via the messaging interface, the interaction application may perform an automatic sticker search and determine the candidate stickers based on a result of the automatic sticker search.

In some examples, the candidate stickers are automatically arranged in a sequence and "previewed" or represented as the search icon in an order as defined by the sequence. Once the user selects the search icon, the dynamic preview function may be automatically stopped and a search tab may be presented, enabling the user to browse the candidate stickers or navigate to other sticker categories. In some cases, in the absence of user input to stop the dynamic previews, the interaction application may cycle through the sequence of preview stickers and, once the full sequence has been executed, the interaction application may, for example, present a first (e.g., most relevant) search result, which remains static as the search icon until further user input is received. In other cases, the interaction application may continue to repeat the sequence while in the dynamic preview state.

In some examples, the search icon presents a thumbnail of the corresponding sticker, e.g., a smaller version of the sticker that serves as a preview or representation of the larger or full-sized sticker. The use of such a search icon may enable quicker browsing, conserve bandwidth, or improve the overall user experience.

Examples of the present disclosure may address technical hurdles to facilitating sticker selection or usage by surfacing a sticker to a messaging interface (e.g., adjacent to the input field), based on automatic sticker search results, allowing for top-level surfacing of a CTA and placing an enhanced emphasis on a search icon. Examples may return and dynamically present relevant stickers to a user, enabling the user more easily to assess the search results, e.g., to decide whether to access a lower level of the messaging interface, such as a "sticker picker." This feature may reduce processing requirements by only presenting a subset of stickers at a first stage (while the user is viewing a top level interface), e.g., the user does not need to access a full set of available stickers at the first stage, as the previewed stickers can be assessed before making a decision.

The interaction application may dynamically switch between different search icon states. For example, initially, the interaction application may be in a non-preview state in which a non-user specific icon is displayed as the search icon. Then, in response to detecting populating of an input field, or in response to the transmission of a message, the interaction application may automatically retrieve search results and transition to a preview state that provides dynamic search result previews (e.g., presented sequentially as a search icon in a thumbnail-type preview), as described herein.

Examples of the present disclosure provide a useful sticker search function. A local search engine (e.g., that executes while a user is typing) may be provided to enable quick surfacing of results. Local sticker search functionality implemented at a user device (as opposed to a server-side device) may address technical hurdles associated with quick surfacing of meaningful sticker search icons.

When the effects in this disclosure are considered in aggregate, one or more of the methodologies described herein may obviate a need for certain efforts or resources that otherwise would be involved in the selection or application of stickers in the context of an interaction system. Computing resources used by one or more machines, databases, or networks may be more efficiently utilized or even reduced, e.g., as a result of automatic surfacing of relevant sticker content, as a result of dynamic sticker previews at a top user interface level, or as a result of a reduced number of user selections or processing operations required to compose a desired message. Examples of such computing resources may include processor cycles, network traffic, memory usage, graphics processing unit (GPU) resources, data storage capacity, power consumption, and cooling capacity. Many other advantages of the present inventive subject matter will be readily apparent to those skilled in the art from the description of the several figures that follows.

Networked Computing Environment

FIG. 1 is a block diagram showing an example interaction system 100 for facilitating interactions (e.g., exchanging text messages, conducting text, audio and video calls, or playing games) over a network. The interaction system 100 includes multiple user systems 102, each of which hosts multiple applications, including an interaction client 104 (as an example of an interaction application) and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Application Programming Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to deploy particular technology and functionality within the interaction server system 110 initially, but later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, content augmentation (e.g., filters or overlays), message content persistence conditions, entity relationship information, and live event information. Data exchanges within the interaction system 100 are invoked and controlled through functions available via user interfaces of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104). The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
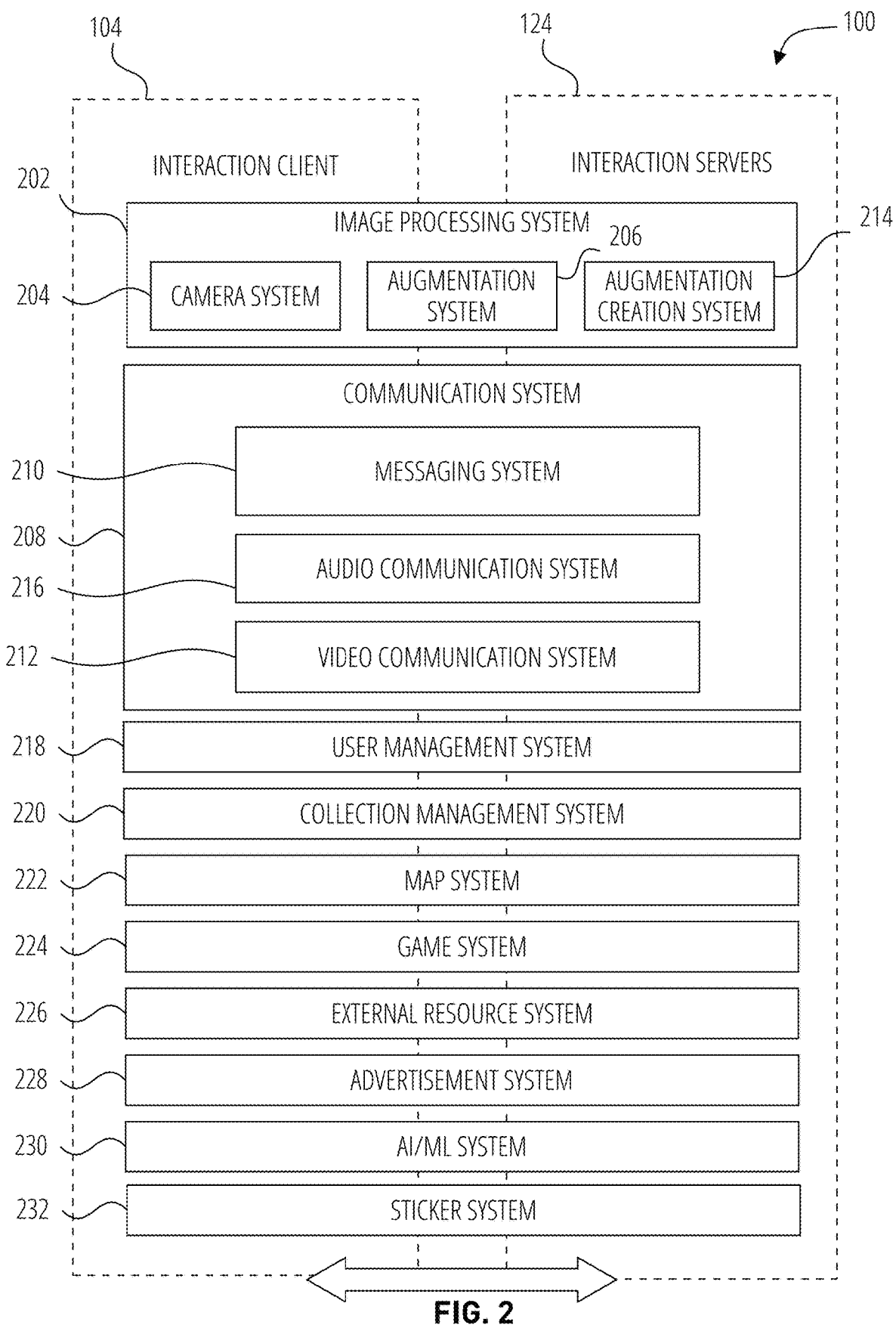
FIG. 2 is a diagrammatic representation of an interaction system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture. Example subsystems are discussed below.

An image processing system 202 provides various functions that enable a user to capture and augment (e.g., annotate, or otherwise modify or edit) media content associated with a message. A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., filters or media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1402 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, stickers, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates. In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

Referring to "stories" generally, a story is a specific type of message that is usually a collection of images or videos divided into several short sequences. A story may be accompanied by backgrounds, music, audio, texts, stickers, animations, effects and emojis. In some cases, the aim of posting a story is to tell a narrative (e.g., an everyday experience) or to convey a message. In many instances, once a story has been posted, the story may only be available for viewing by others for a short time (e.g., twenty-four hours). Within the interaction system 100, content creation tools may allow a content creator to add a hashtag or specify a location to provide further context for a story.

A map system 222 provides various geographic location functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate (e.g., apply a visual augmentation to) images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. As described further below, the artificial intelligence and machine learning system 230 may also provide functionality to surface relevant search results, such as sticker search results or sticker recommendations.

The artificial intelligence and machine learning system 230 may also provide chatbot functionality to message interactions 120 between user systems 102 and between a user system 102 and the interaction server system 110. The artificial intelligence and machine learning system 230 may also provide generative functionality, e.g., allowing a user to generate text, image, or video content based on prompts. The artificial intelligence and machine learning system 230 may work with the audio communication system 216 to provide speech recognition and natural language processing capabilities, allowing users to interact with the interaction system 100 using voice commands.

A sticker system 232 provides various sticker functions within the context of the interaction system 100, e.g., within the messaging system 210. A sticker may be placed or added (e.g., at a user-defined position) within a message. A sticker may accompany other content (e.g., text and/or images) within a message. Alternatively, a sticker may itself correspond to the entirety of a message.

The sticker system 232 may implement a sticker search icon state selection feature that is configured to select or transition to a specific sticker search icon state from among a plurality of sticker search icon states of the interaction client 104. One or more states may be preview states that surface, within a messaging interface, a preview of a sticker as a sticker search icon. In a dynamic preview state, the sticker system 232 cycles through different stickers that are determined to be potentially relevant or of interest to the user. One or more states may be non-preview states. In a non-preview state, the search icon may be a non-user specific icon, e.g., a gray smiley icon or a generic sticker logo. The sticker system 232 may dynamically select and/or switch between sticker search icon states to facilitate user selection of stickers within the context of the interaction client 104, as described further below.

The sticker system 232 may implement a sticker search engine that provides a sticker search function. In some cases, the user may manually enter a search query, and in other cases the sticker system 232 may implement an automatic sticker search function without the user explicitly entering a query in a dedicated search field. For example, in response to a user adding text to an input field (as opposed to a dedicated search field), or in response to a user sending a message with text content, the sticker system 232 may initiate an automatic sticker search to surface a set of stickers that are determined to be relevant to or similar to the text. In other words, the text typed or sent by the user may automatically be applied as a search query to the sticker search engine.

Stickers may be stored in a sticker table 320 (as described below) in association with various metadata, facilitating sticker searches. For example, metadata may be text, such as words that describe a sticker, or synonyms for words appearing in the sticker. In some examples, the sticker search engine operates using a combination of text processing, indexing, and machine learning techniques (e.g., facilitated by the artificial intelligence and machine learning system 230) to return relevant stickers based on user input or user text. An example overview is provided below:

- Metadata and tagging: Each sticker is associated with metadata, including keywords and descriptions. For example, a sticker that depicts a person waving and saying "Hi," can be associated with metadata including words such as "Hi," "Hello," "Good day," "Hey," "Wave," "Hand," and the like. This metadata is generated by manual tagging or through automated methods, such as natural language processing (NLP) or machine learning algorithms that can analyze and classify the content based on visual features.
- Text processing: The relevant text is processed to identify keywords or phrases. This process may involve tokenization, stemming, and/or removing stop words.
- Query matching: The sticker search engine compares the processed query with the metadata associated with stickers. Query matching may involve various techniques, such as string matching, term frequency-inverse document frequency (TF-IDF), or vector space models to measure similarity between the query and the metadata, or relevance of the metadata to the query.
- Ranking and retrieval: Based on, for example, similarity scores or relevance scores, the sticker search engine may rank the stickers and return data identifying the stickers and ranking. Machine learning algorithms, e.g., neural networks or deep learning models, may be implemented to improve the accuracy and relevance of search results.
- User feedback: In some cases, user feedback, such as the frequency of use or explicit user ratings, may be fed back into a model or system to refine and improve the engine's accuracy and relevance over time.

As described below, a sticker search engine may return search results based on a search query. In some examples, the sticker system 232 may implement a sticker recommendation, or sticker suggestion, feature that is configured to select, from among the collection of available stickers, one or more suggested stickers for use in a message. For example, when a user is viewing a particular media content item (e.g., a message with media content, a story, etc.) communicated to the user by another user, the interaction client 104 may invoke the sticker suggestion service to generate and present a selection of recommended stickers that may be used in a reply message. As another example, when a user opens a messaging interface (e.g., a chat window), the interaction client 104 may invoke the sticker suggestion service to generate and present one or more suggested stickers as a "conversation starter." These suggestions are not necessarily based on text and may, for example, be based on context or historical user activity. The sticker suggestion feature may utilize a pre-trained machine learned model, e.g., implemented by the artificial intelligence and machine learning system 230, which takes as input features various attributes and characteristics, e.g., attributes and characteristics of a message that has been received and viewed by the end user. In addition, the machine learning model may take as input features various attributes and characteristics of a sending user and a receiving user. The machine learning model may be trained to generate relevance scores for stickers, based on input features provided to the model reflecting various attributes and characteristics, and to output suggested stickers based on the relevance scores. In some examples, a rules-based selection algorithm may be used to filter or select relevant stickers.

In some examples, the sticker system 232 is configured to maintain a collection of stickers that are available for messaging with respect to the interaction client 104. Accordingly, with some examples, in addition to maintaining the stickers, the sticker system 232 may have and maintain a taxonomy, or a hierarchy of categories or tags, used to organize the available stickers. For instance, a sticker identifier or ID, uniquely identifying a specific sticker, may be assigned to one or more categories, by virtue of assigning or associated one or more tags with the sticker ID. Accordingly, at least with some examples, the pre-trained machine learning model may be a classifier and may generate a relevance score for each of several categories or tags, such that stickers that are associated with the highest scoring categories or tags can be selected for presenting to a message recipient as recommended reply stickers. By way of example, various stickers may convey a message relating to a holiday—e.g., "Happy Holidays," "Merry Christmas," or "Happy St. Paddy's Day." These stickers may then be associated with or assigned to a tag (e.g., a holiday tag), indicating that the stickers are associated with a holiday. When a user receives a message, the various attributes and characteristics of the message, the sender, and the recipient of the message, are provided as input to the pre-trained machine learning model. If the category or tag for holidays receives a high relevance score as output by the machine learning model, then one or more of the stickers assigned to that category or tag may be selected for presenting to a user as a suggested reply sticker.

Data Architecture

Figure 3:
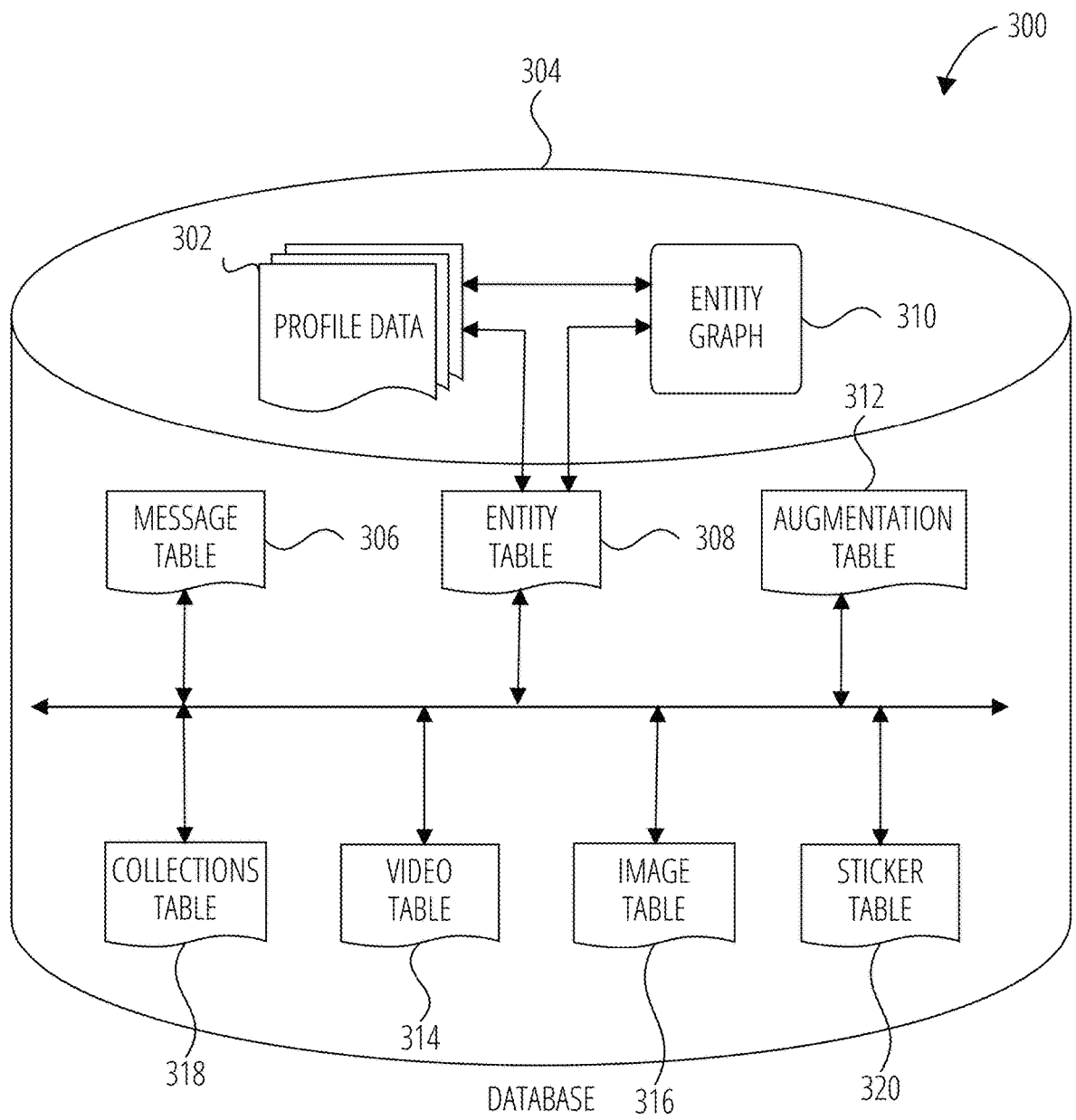
FIG. 3 is a diagrammatic representation of a data structure as maintained in a database, according to some examples.

FIG. 3 is a schematic diagram illustrating data structures 300, which may be stored in a database 304 of the interaction server system 110 (e.g., the database 128 or another database), according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 13.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The sticker table 320 stores various data relating to digital stickers that may be associated with media content items or messages. By way of example, the sticker table 320 may store for each sticker a unique sticker identifier (ID), which may then be associated with various categories, tags and/or other metadata. For example, the ID may be associated with keywords and with a sticker type, e.g., "avatar category."

The sticker table 320 may also store sticker selection history data of a user. For example, the sticker table 320 may store a set of the ten, or twenty, or thirty, most recently used stickers of the user.

In some examples, the sticker system 232 may be a distributed system, such that the sticker system 232 may reside in part on each user system 102. In some examples, the sticker system 232 may reside fully at each user system 102, e.g., may be periodically updated from the interaction server system 110.

At least with some examples, a sticker search engine or sticker suggestion service may generate search results, relevance scores, or the like, for selecting stickers, at the user system 102. In some examples, a predefined set of stickers are stored locally at the user system 102, e.g., a periodically updated set. For example, when new stickers become available or supported by the interaction system 100, they may be downloaded to the user system 102 to update a local set of stickers for use by a local search engine.

The sticker table 320 may store dynamic sticker preview trigger data, e.g., rules governing when to trigger a preview state in which candidate stickers are dynamically previewed as a search icon. The sticker table 320 may also store sticker suggestion trigger data, e.g., rules governing when to trigger the sticker suggestion service.

Figure 4:
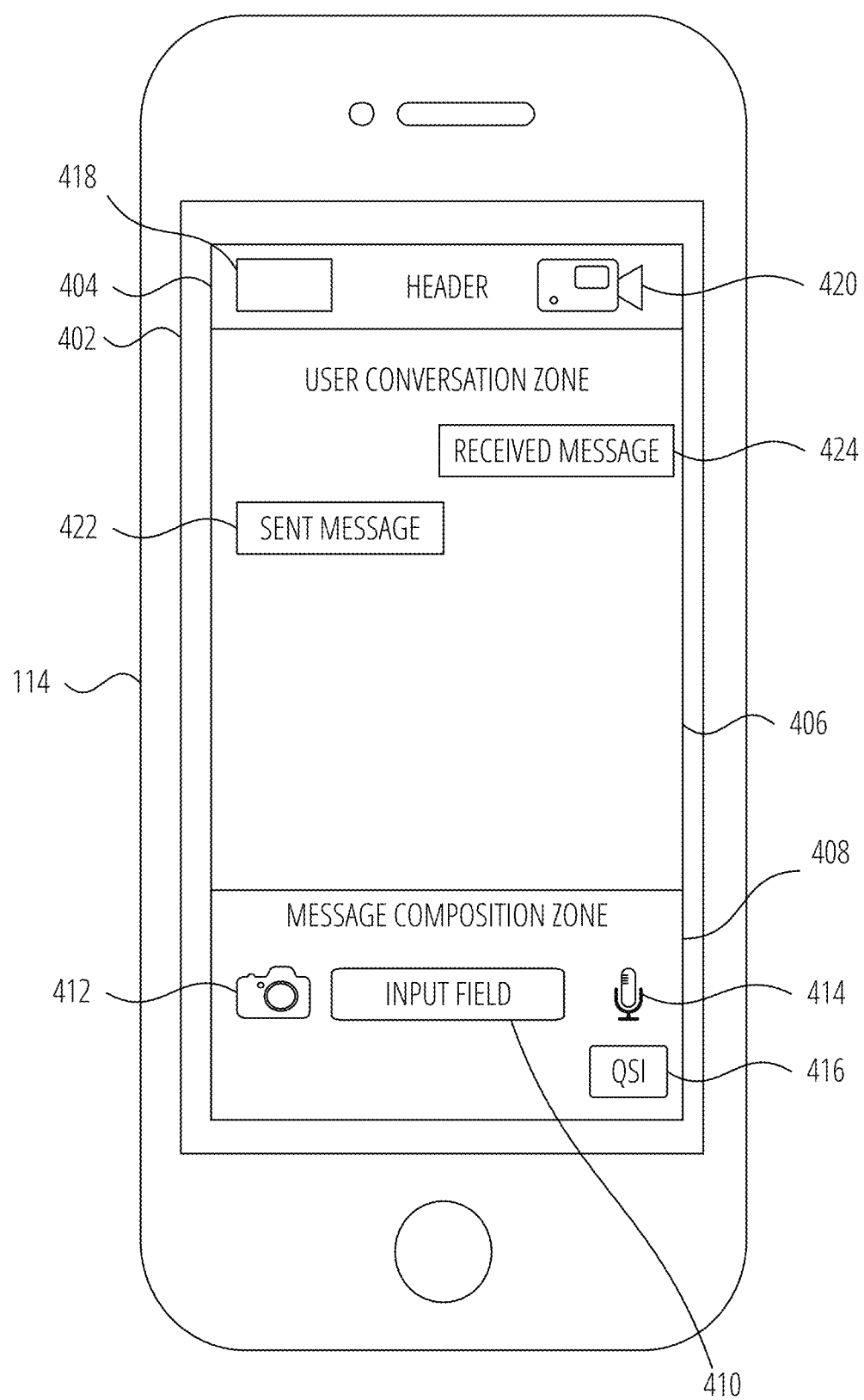
FIG. 4 is a user interface diagram illustrating a messaging interface of an interaction application, wherein the messaging interface includes a sticker search icon, according to some examples.

FIG. 4 is a user interface diagram illustrating a messaging interface 402 of an interaction application, as may be presented on the display of a mobile device 114 (as an example of a user system 102) by the interaction system 100, according to some examples. The messaging interface 402 enables a user to view and interact with messages received from another user, and to compose and send messages to the other user. The active user of the messaging interface 402 as shown in FIG. 4 (and FIGS. 6-12) is referred to below, for ease of reference, as the sending user.

It is noted that while the example interfaces in FIGS. 4 and 6-12 are described and shown as being presented on a touch screen, such as a screen of the mobile device 114, interfaces according to some examples may also be presented using other types of devices that can provide suitable user interfaces or displays, e.g., the optical display of a head-wearable apparatus 116, a desktop computer, or via smart contact lenses. Examples of the present disclosure are thus not restricted to user interfaces that require touch-based gestures.

The messaging interface 402 includes a header 404 that presents a receiving user identifier 418 (e.g., details of the receiving user who is sending messages to and/or receiving messages from the sending user, or details of a user group in the case of one-to-many messaging), as well as calling options 420, such as an option for the sending user to initiate a voice call or a video call with the receiving user. The messaging interface 402 further includes a user conversation zone 406 that displays a user conversation history, e.g., a history of messages exchanged between the sending user and the receiving user (if any). A sent message 422 and a received message 424 are shown to illustrate example contents of the user conversation zone 406, according to some examples.

A message composition zone 408 is presented below the user conversation zone 406 and enables the sending user to compose a message for transmission to the receiving user via the messaging interface 402 of the interaction client 104. The message composition zone 408 includes an input field 410 that enables the sending user to input text or image data to form part of the message. The message composition zone 408 further includes a number of tools to facilitate message composition, including a camera button 412 that is user selectable to launch a camera function of the interaction client 104 that enables the sending user to capture or select an image (or video) for inclusion in a message, and a voice message button 414 that is user selectable to launch a voice recording function of the interaction client 104 that enables the sending user to record a voice message for transmission to the receiving user.

The sending user may wish to send a sticker to the receiving user, either as a standalone message or together with other message content (e.g., text). To this end, the message composition zone 408 includes a user-selectable search icon in the example form of a quick search icon 416, or QSI, that is presented together with the input field 410, the camera button 412, and the voice message button 414, within the messaging interface 402. The interaction client 104 may receive user input to select the quick search icon 416, e.g., through a tapping gesture directed at the quick search icon 416 within the messaging interface 402. Responsive to receiving the user input to select the quick search icon 416, the interaction client 104 presents a sticker search graphical element (e.g., a sticker search panel), examples of which are described with reference to FIG. 9 and FIG. 12.

The sticker search graphical element may present one or more user-selectable stickers for selection by the user, and may be user-navigable to enable the user to browse for stickers that are arranged by sticker category. In some examples, the sticker search graphical element is searchable to enable the user to search for stickers that correspond to specific search queries.

Once the sending user has located a desired sticker, the sending user provides appropriate user input to select the sticker. For example, the sending user may perform a tapping gesture directed at the desired sticker, in response to which the interaction client 104 causes presentation of the desired sticker in the input field 410. The sending user may then select a "send" option, causing the interaction system 100 to transmit a message that includes the desired sticker to a user device of the receiving user (e.g., in the sent message 422).

The appearance of the quick search icon 416 is, in some examples, based on a sticker search icon state of the interaction client 104 with respect to the specific messaging interface 402. In some cases, the sticker search icon state causes the quick search icon 416 to be presented as a user-specific sticker from among the available stickers of the interaction system 100, while in other cases, the sticker search icon state causes the quick search icon 416 to be presented as a non-user specific icon. The messaging interface 402 may present dynamic previews of different user-specific stickers. These states may be selected and updated dynamically by the interaction system 100, based on context and/or user inputs, as will be described further below.

Figure 5:
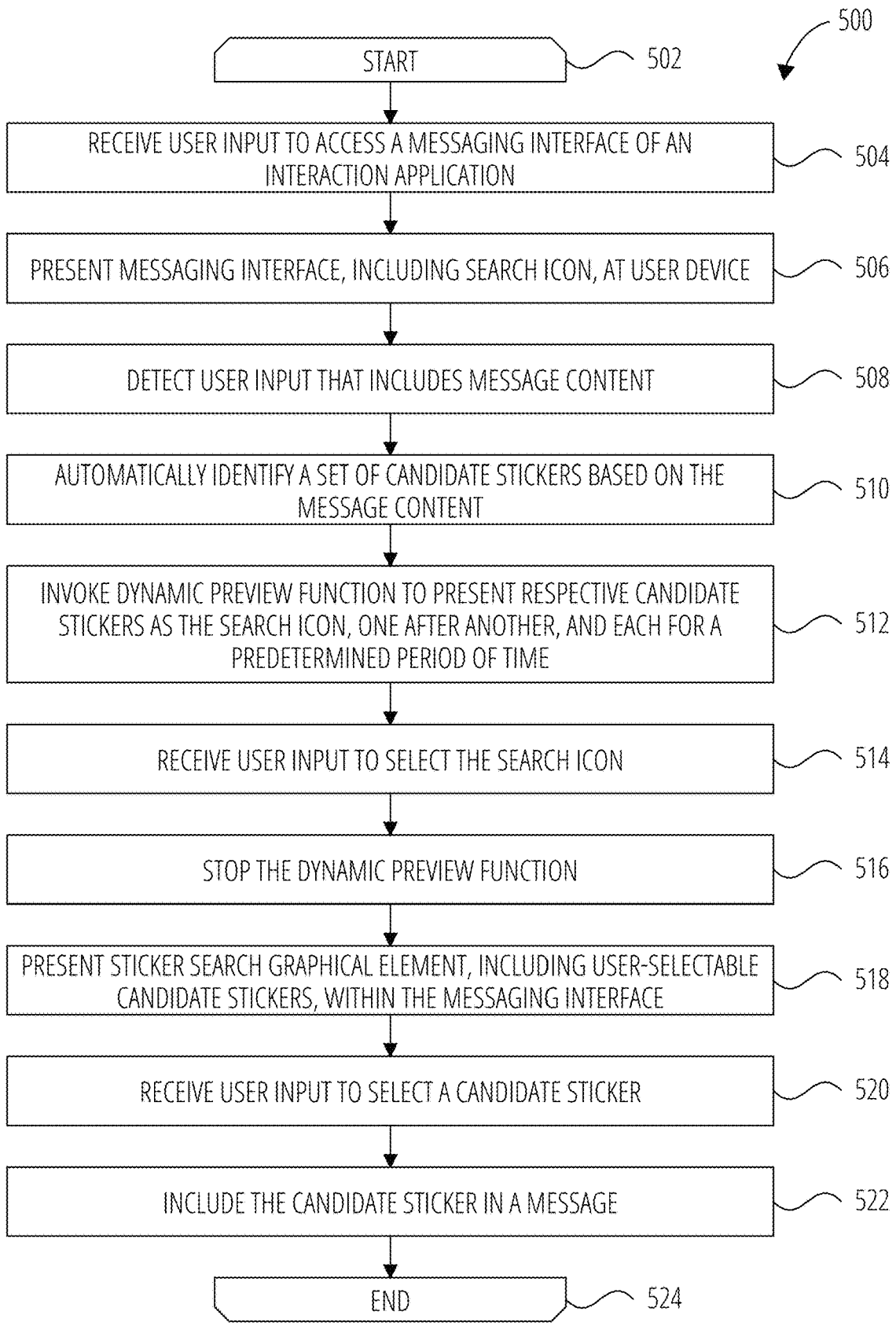
FIG. 5 is a flowchart illustrating a method suitable for facilitating selection of stickers within the context of an interaction system.

FIG. 5 is a flowchart illustrating a method 500 suitable for facilitating selection of stickers within the context of the interaction system 100. The method 500 is performed, in some examples, by various subsystems of the interaction system 100, e.g., the messaging system 210 and/or the sticker system 232. The messaging interface 402 is used as an example user interface to describe certain aspects of the method 500, but it should be appreciated that the method 500 may be performed using various different user interface types, designs, or arrangements.

The method 500 commences at opening loop element 502, and progresses to operation 504, where the interaction client 104 receives user input to access a messaging interface of the interaction client 104. For example, the sending user may access a messaging interface 402 as shown in FIG. 4. Other examples include the sending user making a selection to reply to or comment on a media content item shared by another user, or the sending user making a selection to add content to an image or video (e.g., to overlay content onto the image or video before sharing a final version thereof with other users).

The interaction client 104 presents the messaging interface 402, including the quick search icon 416, at the mobile device 114 at operation 506. The interaction client 104 detects user input that includes message content (operation 508). For example, the interaction client 104 may detect that the sending user is in the process of, or has, added text to the input field 410, or detect a sent message 422 that was composed by the sending user.

Based on the message content detected by the interaction client 104 (which may be in a sent message or an unsent message that is still being composed), the interaction client 104 automatically identifies a set of candidate stickers at operation 510. The set of candidate stickers is a subset of the stickers supported by the sticker system 232. As described above, the sticker system 232 may be used to perform an automatic sticker search in order to obtain the set of candidate stickers. Each sticker (or many stickers) supported by the interaction application may be stored in association with sticker metadata such that a candidate sticker is determinable, during the automatic sticker search, based on relevance of the sticker metadata of the candidate sticker to the message content used as the query, or based on similarity of the sticker metadata of the candidate sticker to the query.

In some examples, the interaction client 104 identifies a predetermined number of stickers, e.g., the five or ten stickers identified as being potentially the most relevant. In some examples, only a limited number of search results may be obtained, e.g., only two or three stickers may sufficiently match the search query, in which case the interaction client 104 may select such a limited number of search results as the set of candidate stickers. In some cases, and as described further below, the interaction client 104 may identify one relevant sticker per sticker category, and these stickers may constitute the set of candidate stickers.

The interaction application may communicate a request to the sticker system 232 for one or more stickers. The sticker system 232, after identifying the stickers to return, may communicate an indication of the stickers to the user system 102 of the sending user. For instance, with some examples, the indication is a sticker ID for each sticker being provided as a candidate sticker.

At operation 512, the interaction client 104 invokes a dynamic preview function to present respective candidate stickers as the search icon, one after another, and each for a predetermined period of time, e.g., 2 or 3 seconds at a time. The interaction client 104 thus enters a dynamic preview state which causes updating of the appearance of the quick search icon 416 within the messaging interface 402, and the user, when viewing the messaging interface 402, sees a sequence of stickers that provide a preview of relevant search results. As mentioned, the candidate stickers may be shown to provide previews of the search results obtained through the automatic sticker search, allowing the user to see the candidate stickers, or a "thumbnail" version thereof, for example, to assess their relevance to the message the user wishes to compose or convey.

It may be advantageous to store the sticker data locally (e.g., cached on the user system 102), thus allowing for surfacing of the appropriate quick search icon 416 immediately (or very shortly after) accessing of the messaging interface 402 by the sending user or addition of message content, obviating the need to load the quick search icon 416 from the interaction server system 110 via the network 108.

The interaction client 104 may define a sequence in which the respective candidate stickers are to be presented as the quick search icon 416. For example, the candidate stickers may be arranged such that consecutive stickers in the sequence have different categories, e.g., the first sticker that is surfaced is an avatar sticker, the second sticker that is surfaced is a location-based sticker, the third sticker that is surfaced is a user-created sticker, etc. (reference can be made to the example categories shown in FIG. 9 and FIG. 12). In some cases, the candidate stickers include only one sticker of each type, or category, to provide the user with a useful overview of not only certain relevant stickers, but also specifically the available sticker categories. However, this is merely an example of a type of sequence that may be employed and various other sequences can be implemented. For example, the interaction client 104 may utilize a relevance ranking generated for the candidate stickers by the sticker search engine and sequentially display the stickers from "most relevant" to "least relevant." Alternatively, a random sequence may be executed.

Accordingly, in the method 500, the interaction client 104 dynamically updates the quick search icon 416 by cycling through the candidate stickers. At operation 514, the interaction client 104 receives user input to select the quick search icon 416. The sending user may select the quick search icon 416 that is represented by a particular candidate sticker at a certain point in time. In response, according to the method 500, the interaction client 104 ceases the dynamic updating of the appearance of the quick search icon 416 (operation 516) and presents a sticker search graphical element within the messaging interface 402, e.g., a search panel that displays the candidate stickers for the sending user in a user-selectable manner (operation 518).

The sending user may then select one or more of the presented stickers. In other words, the interaction client 104 may receive user input (operation 520) to select a candidate sticker from among the candidate stickers presented by the sticker search graphical element within the messaging interface 402, or to select a different sticker from among the supported stickers (e.g., where the sending user navigates to a different sticker category). At operation 522, the selected sticker is included in a message, and the method 500 ends at closing loop element 524.

As mentioned, a sticker search icon state of the interaction client 104 may be dynamically updated by the interaction system 100. For example, where a non-preview state is entered initially, a generic or placeholder icon may be presented as the quick search icon 416. However, the sending user may subsequently perform an action that leads to a condition deemed to be a preview state trigger. For example, the interaction client 104 may detect user input to populate the input field 410 of the messaging interface 402 with content (e.g., words to be sent to the receiving user). The interaction client 104 then identifies the user input to populate the input field as a trigger, and, responsive to identifying the trigger, the interaction client 104 may automatically replace the current quick search icon (e.g., the generic or placeholder icon) with a user-specific icon (e.g., a first candidate sticker).

Figure 6:
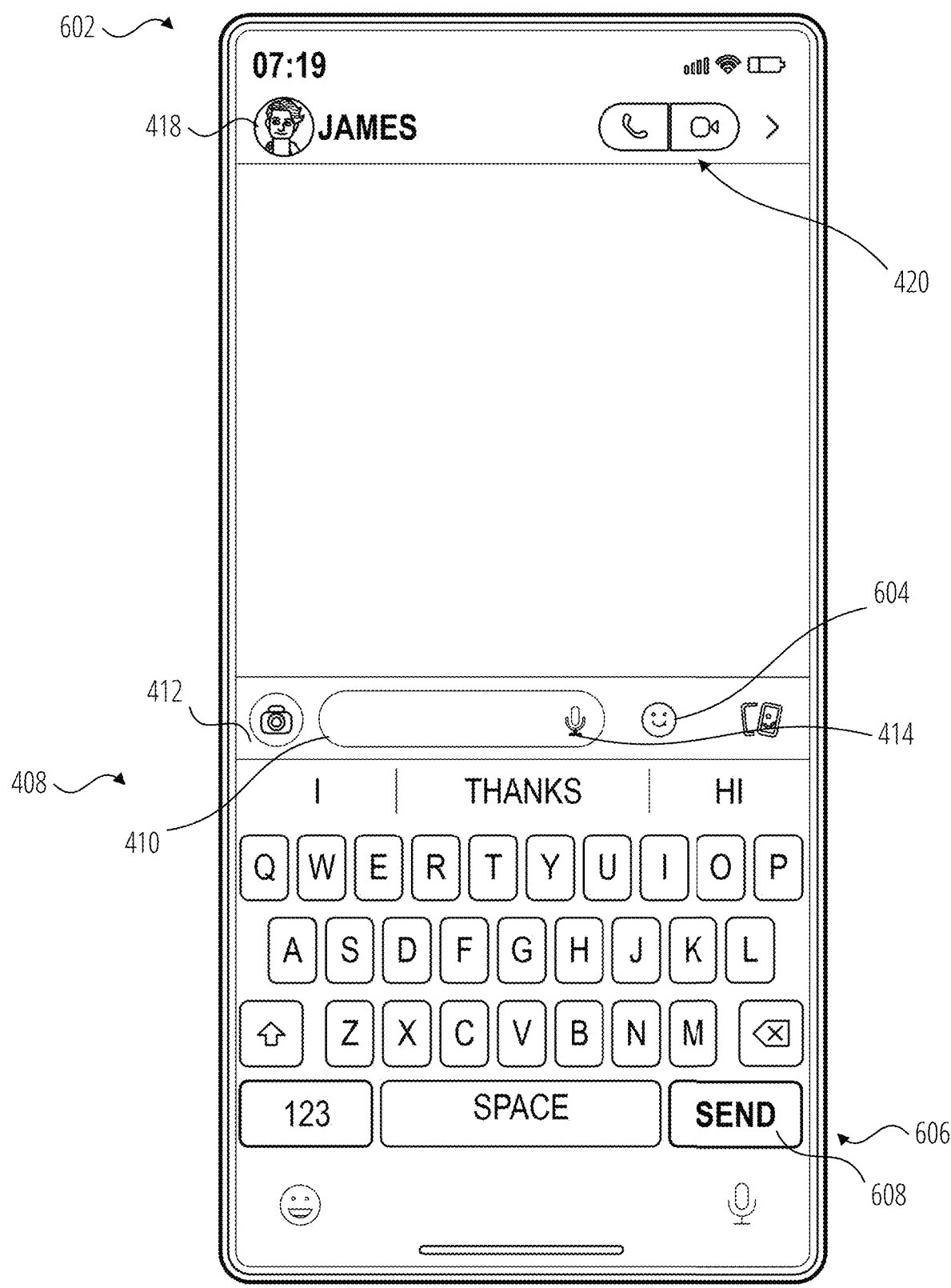
FIG. 6 is a user interface diagram illustrating a messaging interface that shows a sticker search icon in a non-preview state, according to some examples.

FIGS. 6 to 9 illustrate a first user interface sequence, according to some examples. Referring firstly to FIG. 6, a user interface diagram illustrating a messaging interface 602 is shown. The messaging interface 602 includes a sticker search icon, or quick search icon, corresponding to a non-preview state, according to some examples. In the non-preview state of FIG. 6, the sticker search icon is a non-user specific icon 604 in the example form of a generic "smiley face" icon.

This non-user specific icon 604 may be seen as a placeholder icon used in cases where no suggested sticker, or candidate sticker, is detected or available for the specific sending user. User selection of the non-user specific icon 604 causes display of a sticker search graphical element, e.g., a search panel or "sticker picker."

In FIG. 6, the non-user specific icon 604 is not one of the available stickers of the interaction system 100, and is a generic icon that represents the stickers class. Accordingly, in the non-preview state of FIG. 6, a sticker (e.g., a recent sticker or a suggested sticker) is not presented at the top user interface level of the messaging interface 602. In other words, the sending user would need to navigate to a lower level (e.g., by selecting the non-user specific icon 604) to view any stickers. FIG. 6 further illustrates a keyboard 606 which may form part of the message composition zone 408, allowing the sending user to compose text content of a message within the input field 410. A send button 608 is user selectable to cause transmission of the final message.

Figure 7:
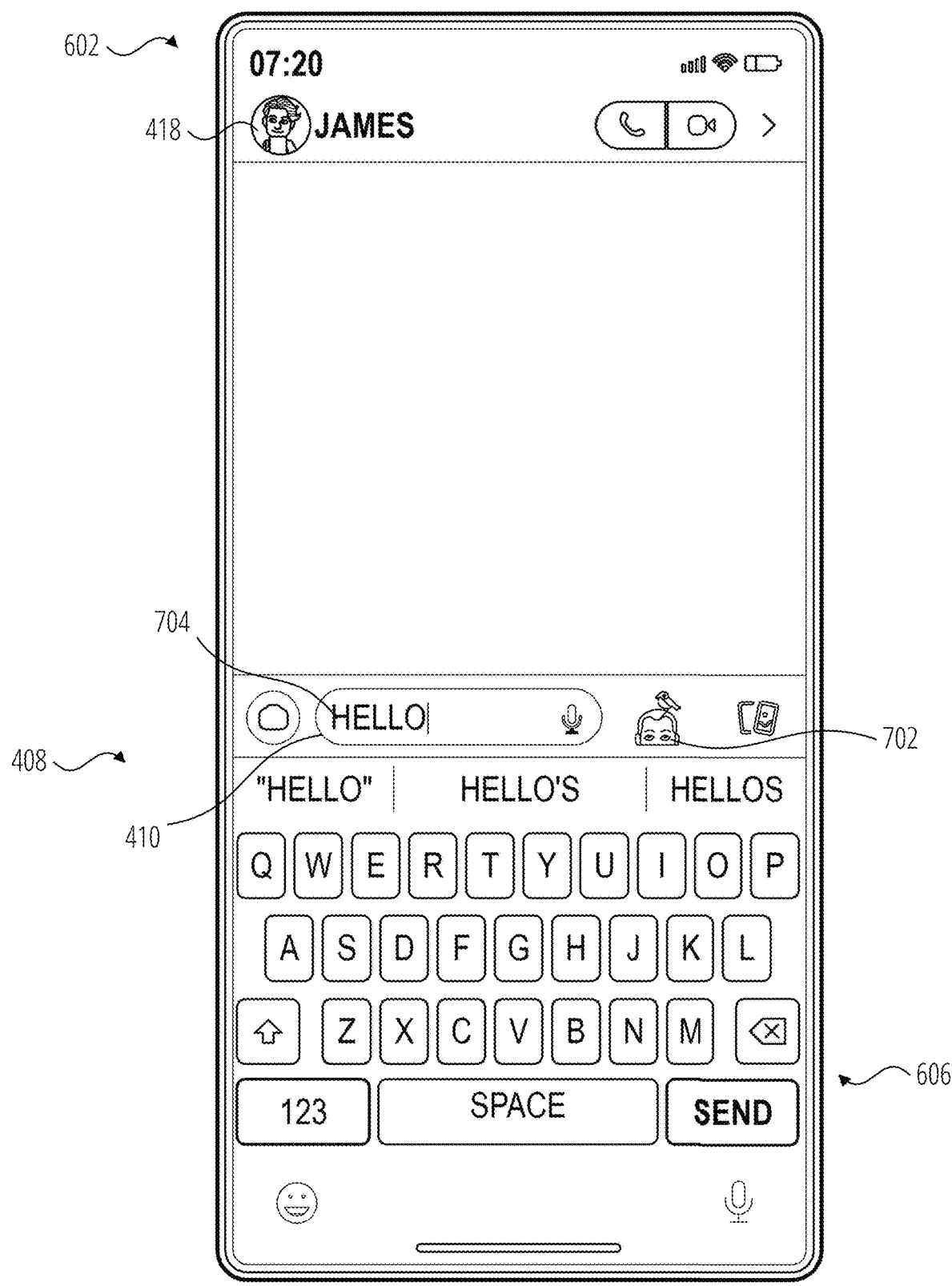
FIG. 7 is a user interface diagram illustrating the messaging interface of FIG. 6, showing the sticker search icon in a dynamic preview state in which a first candidate sticker is presented as the sticker search icon, according to some examples.

Turning to FIG. 7, the sending user starts adding text to the input field 410. For example, and as shown in FIG. 7, the sending user types desired message content 704 (the word "Hello") using the keyboard 606. In FIG. 7, the message content 704 is content that has not been finalized or sent as a message, but is, instead, content entered into the input field 410 that may or may not ultimately be included in a finalized message.

The interaction client 104 detects the message content 704 added to the input field 410 and, in response, activates the dynamic preview state. The message content 704 is used as a search query to perform an automatic sticker search, and the sticker system 232 returns a set of candidate stickers based on the message content 704, e.g., as described above.

The messaging interface 602 is updated to dynamically change the appearance of the search icon. In FIG. 7, a first candidate sticker 702 is presented as the search icon. The first candidate sticker 702 may be presented as the search icon for a predetermined period of time, e.g., 3 seconds, before the interaction client 104 proceeds to surface a next candidate sticker, e.g., in a defined sequence.

Figure 8:
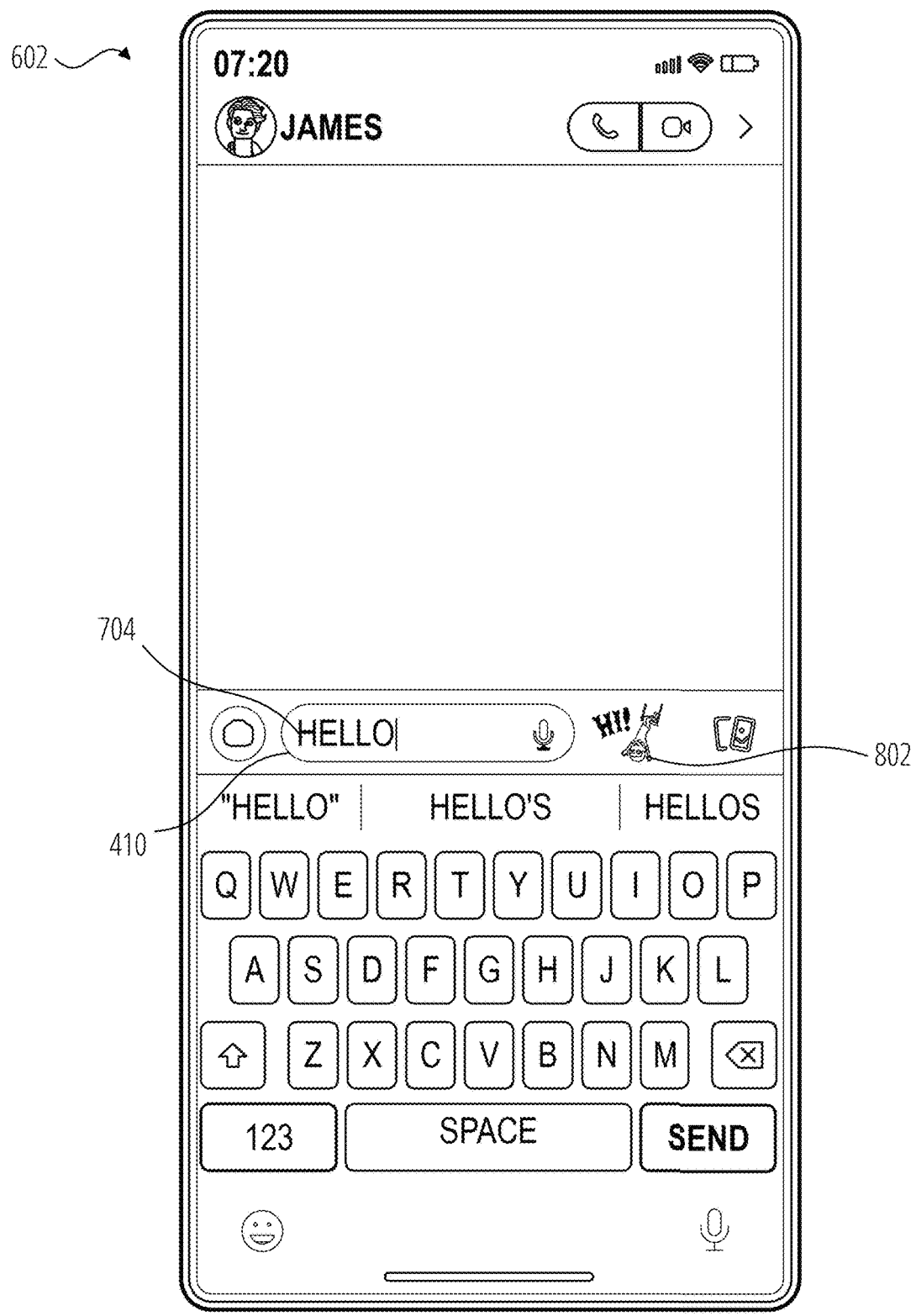
FIG. 8 is a user interface diagram illustrating the messaging interface of FIG. 6, showing the sticker search icon in the dynamic preview state in which a second candidate sticker is presented as the sticker search icon, according to some examples.

FIG. 8 shows a second candidate sticker 802 presented as the search icon within the messaging interface 602. The interaction client 104 automatically applies the second candidate sticker 802 as a replacement to the first candidate sticker 702 (to function as the search icon) within the messaging interface 602. Similarly, the second candidate sticker 802 may be presented for a predetermined period of time before the interaction client 104 proceeds to surface a next candidate sticker.

While only two candidate stickers are shown in FIGS. 6-9 (and also in the second interface sequence described with reference to FIGS. 10-12), it will be appreciated that any number of stickers may be presented in this manner, one after another. In some examples, once the interaction client 104 has presented all the candidate stickers, the interaction client 104 may statically present the first candidate sticker 702, and thus cease further dynamic updates.

In some examples, the interaction client 104 detects a predetermined change in the set of candidate stickers and ceases updating the search icon according to a current sequence. For example, if the interaction client 104 detects that the user has changed the text in the input field 410, candidate stickers may be updated, changing a display sequence or causing the dynamic preview to be halted. Similarly, the other user may send a message to the active user, causing the interaction client 104 to generate a suggested sticker which is then surfaced as the search icon, instead of continuing with the current display sequence.

In some cases, each sticker is linked to a sticker category and the sequence is defined such that consecutive candidate stickers within the sequence have different sticker categories. For example, the first candidate sticker 702 may have a first sticker type (e.g., user-created sticker) and the second candidate sticker 802 may have a second sticker type (e.g., system-generated avatar sticker).

Figure 9:
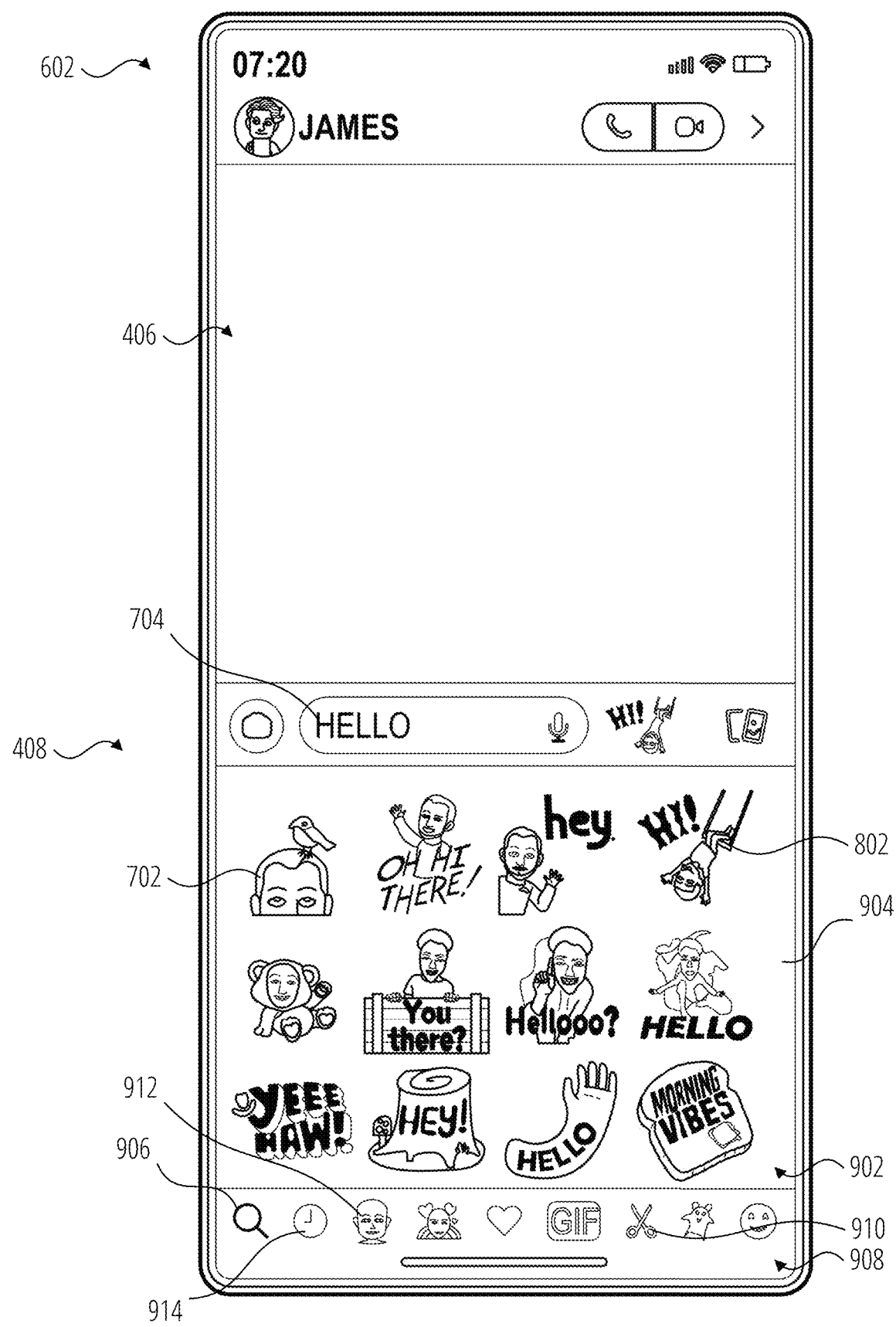
FIG. 9 is a user interface diagram illustrating the messaging interface of FIG. 6, showing a sticker search panel, according to some examples.

Referring to FIG. 7 and FIG. 8, the search icon respectively presents the first candidate sticker 702, the second candidate sticker 802, and other candidate stickers in the sequence, as a thumbnail of the "actual" sticker (see, for example, the corresponding larger first candidate sticker 702 and second candidate sticker 802 shown in FIG. 9). The search icon thus serves as a useful preview icon.

The first candidate sticker 702 and the second candidate sticker 802 are presented at the top user interface level of the messaging interface 602. In contrast to the generic icon of FIG. 6, the first candidate sticker 702 and the second candidate sticker 802 depict available stickers of the interaction system 100. However, similarly to FIG. 6, the first candidate sticker 702 and the second candidate sticker 802 represent the stickers class in that the sticker icon is, in each case, user selectable to launch a sticker search or sticker selection function.

Referring now to FIG. 9, the user selects the sticker icon (e.g., taps on the second candidate sticker 802 as shown in FIG. 8), causing display, by the interaction client 104, of a sticker search graphical element. In FIG. 9, a sticker search graphical element in the example form of a search panel 904 is shown in response to user selection of the search icon within the messaging interface 602.

Referring specifically to FIG. 9, the interaction client 104 automatically enlarges the message composition zone 408 by expanding it upwards (reducing the size of the user conversation zone 406 to accommodate the larger message composition zone 408). The message composition zone 408 is updated to include a plurality of graphical elements and icons, including a set of search results 902 for the sending user. The search results 902 are stickers returned by the sticker system 232 based on the message content 704, e.g., in FIG. 9, given that the message content 704 includes "Hello," the search results 902 are stickers with metadata identical to, related to, or similar to, the word "Hello."

The search results 902 include the candidate stickers that were previewed as the quick search icon, e.g., the first candidate sticker 702 and the second candidate sticker 802. It is noted that the search results 902 may include the set of candidate stickers only, or the set of candidate stickers and additional search results (for example, where the set of candidate stickers is limited so as to include only one sticker per sticker category.)

The search results 902 are arranged by relevance (e.g., relevance score or similarity score), with the first candidate sticker 702 being presented in a first position (top left) within the user-navigable search panel 904 of the message composition zone 408. The search panel 904 may also be referred to as a "sticker picker" section of the messaging interface 602. Of course, in various alternative examples, different presentation formats are possible. The user may select any one or more of the stickers presented within the messaging interface 602.

Within the search panel 904, stickers are arranged according to various sticker categories 908. A search results section, or search results tab 906, is pre-selected based on the selection of the user of one of the (previewed) search results.

The search panel 904 comprises a plurality of other tabs to arrange stickers supported by the interaction system 100 by sticker category. The user may navigate to other sticker categories 908 by selecting the relevant tab at the bottom of the messaging interface 602, e.g., a user-created stickers tab 910, an avatars tab 912, or a recent stickers tab 914.

In some examples, the user may navigate (e.g., swipe or scroll) through each (or one or more) category to view further stickers that are not initially in view within the search panel 904. For example, the user may scroll to the right to view further stickers included in the set of search results 902 retrieved by the interaction client 104.

In some examples, if the user changes the text in the input field 410, the interaction client 104 will automatically update the search results 902 by submitting an updated query to the sticker system 232 and populating the search results 902 with the results corresponding to the changed text. As mentioned, the interaction client 104 may utilize metadata linked to each sticker (e.g., tags or keywords) to retrieve search results based on the search query. In some examples, the interaction client 104 may execute a local search engine (e.g., using sticker data from the sticker table 320 that is locally stored at the user system 102) in order to surface search results quickly, without the need to transmit the query to a server-side component.

Still referring to FIG. 9, and consistent with some examples, upon selecting a sticker from the messaging interface 602, the sticker will automatically be included within the input field 410 and be ready for sending (e.g., by selecting a send button). In this way, the sending user can select a sticker, e.g., a candidate sticker that is automatically surfaced as a first category based on the sticker search icon state, and send it to a receiving user (e.g., with some additional text or other content). However, in some alternative examples, upon selecting a sticker from the messaging interface 602, the sticker will automatically be sent as a message, without any additional text and without requiring selection of a send button or further user action.

Figure 10:
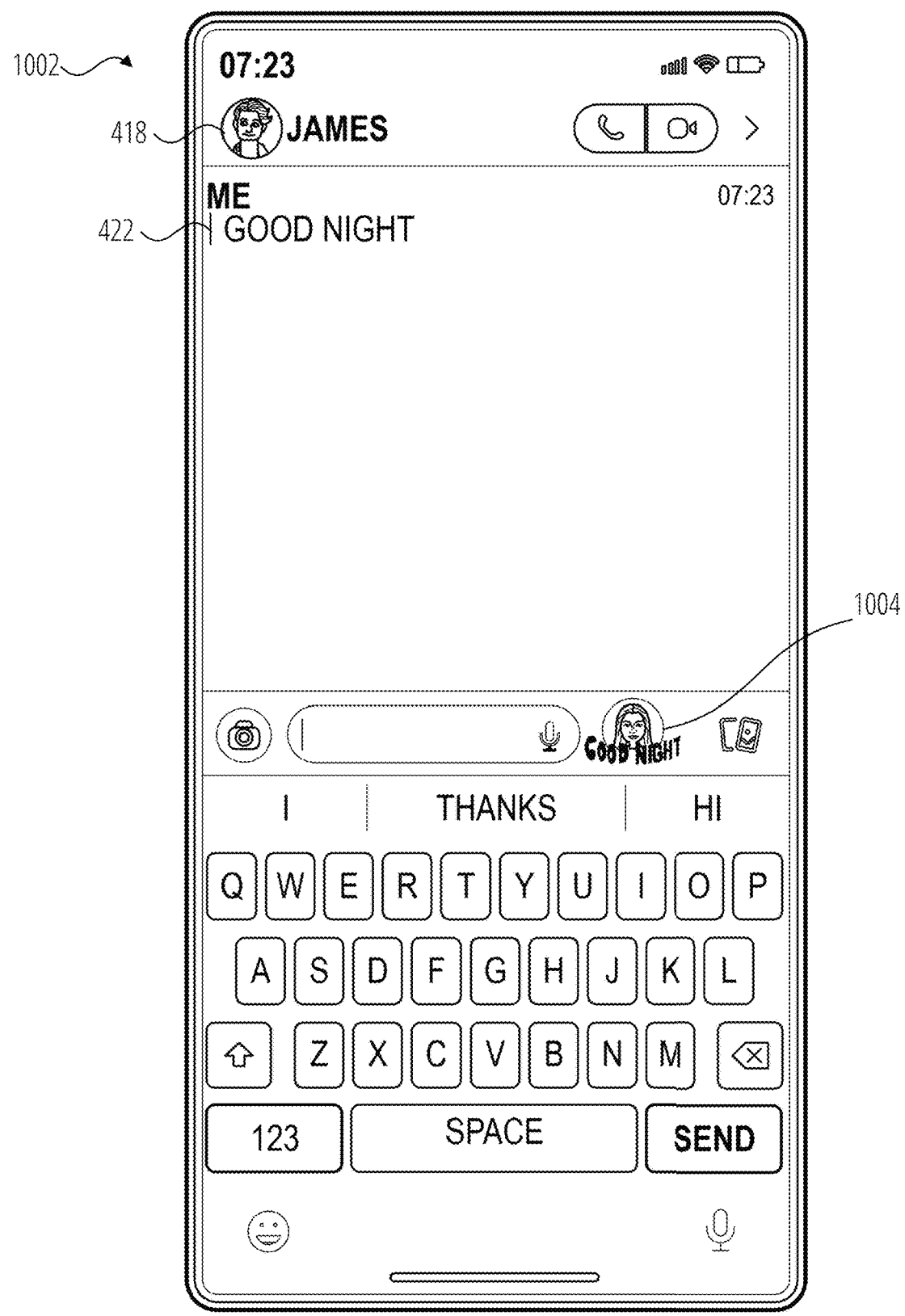
FIG. 10 is a user interface diagram illustrating a messaging interface that shows a sticker search icon in a dynamic preview state in which a first candidate sticker is presented as the sticker search icon, according to some examples.
Figure 11:
FIG. 11 is a user interface diagram illustrating the messaging interface of FIG. 10, showing the sticker search icon in the dynamic preview state in which a second candidate sticker is presented as the sticker search icon, according to some examples.
Figure 12:
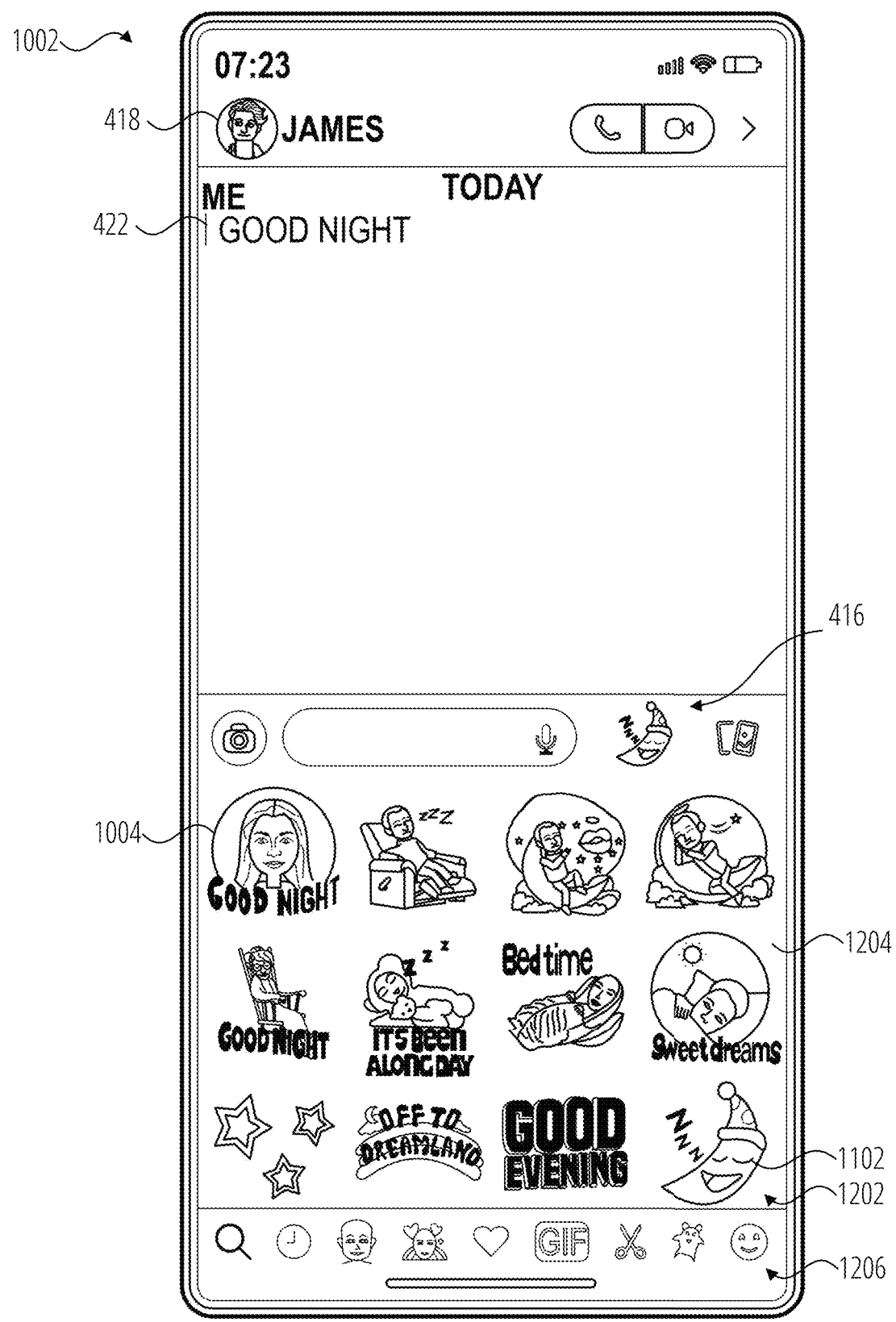
FIG. 12 is a user interface diagram illustrating the messaging interface of FIG. 10, showing a sticker search panel, according to some examples.

FIGS. 10 to 12 illustrate a second interface sequence, according to some examples. Referring firstly to FIG. 10, a user interface diagram illustrating a messaging interface 1002 is shown. The messaging interface 1002 includes a sticker search icon, or quick search icon, corresponding to a dynamic preview state, according to some examples.

In FIG. 10, the sending user has sent a message, referred to as the sent message 422, to a receiving user, as identified by the receiving user identifier 418. The interaction client 104 detects the message content of the sent message 422 and, in response, activates the dynamic preview state. The message content of the sent message 422 (e.g., the text "Good night") is used as a search query to perform an automatic sticker search, and the sticker system 232 returns a set of candidate stickers, e.g., in a manner as described above.

The messaging interface 1002 is updated to dynamically change the appearance of the search icon. In FIG. 10, a first candidate sticker 1004 is presented as the search icon, and it is dynamically updated by the interaction client 104 to present a second candidate sticker 1102, as shown in FIG. 11. As described above, the user may select the search icon (e.g., when presented as the second candidate sticker 1102 as in FIG. 11), to cause presentation of a search panel.

Referring now to FIG. 12, a search panel 1204 that is functionally similar to the search panel 904 of FIG. 9 is presented, in response to user selection of the search icon. The search results 1202 that are initially and automatically shown within the search panel 1204 are stickers returned by the sticker system 232 based on the contents of the sent message 422, including the first candidate sticker 1004 and the second candidate sticker 1102. The user may navigate the search panel 1204 to view further stickers, including those in other sticker categories 1206.

In FIG. 12, given that the sent message 422 includes "Good night," the search results 902 are stickers with metadata identical to, similar to, or related to, the text "Good night." In FIG. 12, the dynamic updating of the quick search icon 416 is automatically ceased when the search panel 1204 is presented.

Data Communications Architecture

Figure 13:
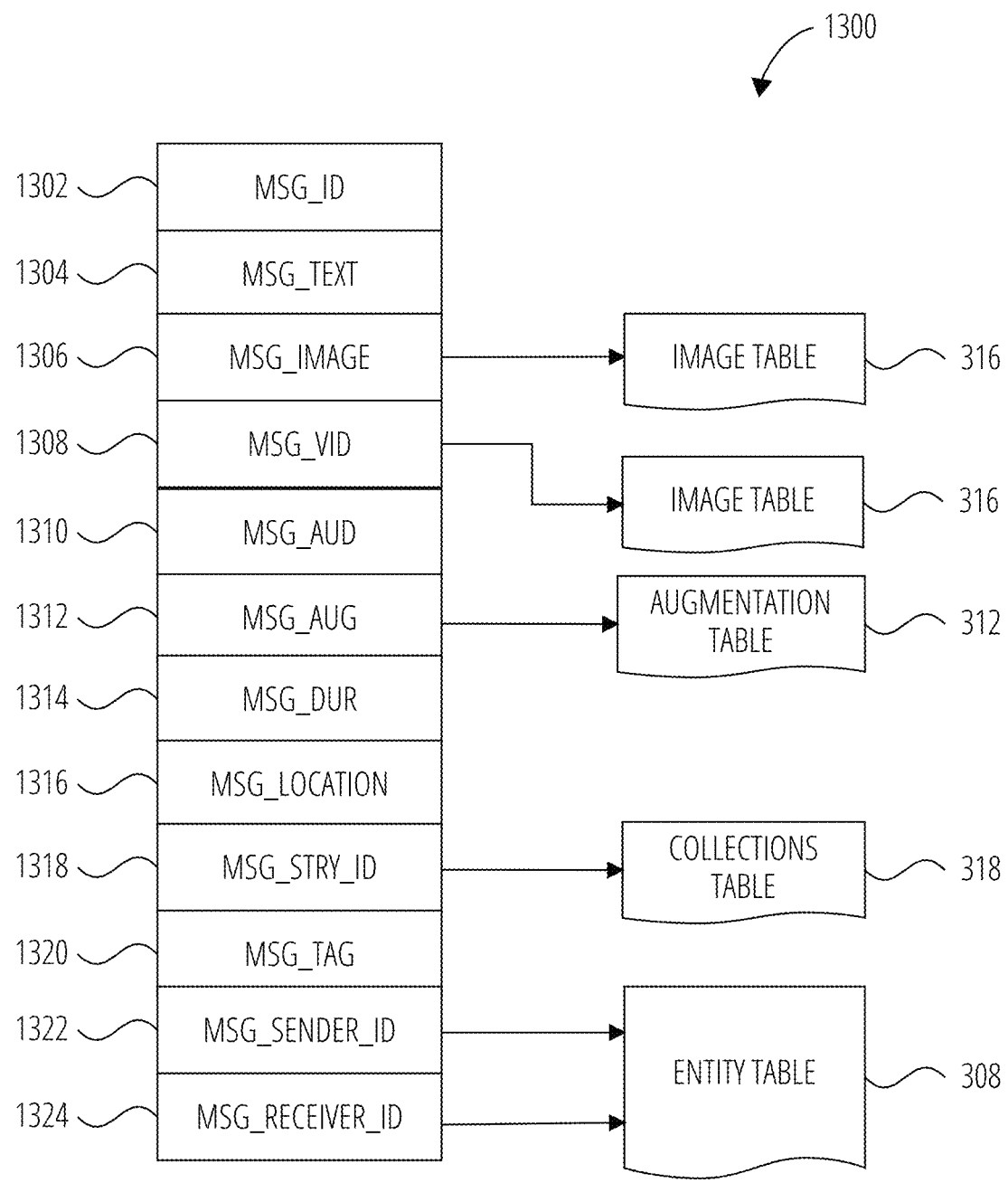
FIG. 13 is a diagrammatic representation of a message, according to some examples.

FIG. 13 is a schematic diagram illustrating a structure of a message 1300, according to some examples, generated by an interaction client 104 for communication to a further interaction client 104 via the interaction servers 124. The content of a particular message 1300 is used to populate the message table 306 stored within the database 304, accessible by the interaction servers 124. Similarly, the content of a message 1300 is stored in memory as "in-transit" or "in-flight" data of the user system 102 or the interaction servers 124. A message 1300 is shown to include the following example components:

- Message identifier 1302: a unique identifier that identifies the message 1300.
- Message text payload 1304: text, to be generated by a user via a user interface of the user system 102, and that is included in the message 1300.
- Message image payload 1306: image data, captured by a camera component of a user system 102 or retrieved from a memory component of a user system 102, and that is included in the message 1300. Image data for a sent or received message 1300 may be stored in the image table 316. Image data may include stickers from the sticker table 320.
- Message video payload 1308: video data, captured by a camera component or retrieved from a memory component of the user system 102, and that is included in the message 1300. Video data for a sent or received message 1300 may be stored in the image table 316.
- Message audio payload 1310: audio data, captured by a microphone or retrieved from a memory component of the user system 102, and that is included in the message 1300.
- Message augmentation data 1312: augmentation data (e.g., filters, stickers, or other annotations or enhancements) that represents augmentations to be applied to message image payload 1306, message video payload 1308, or message audio payload 1310 of the message 1300. Augmentation data for a sent or received message 1300 may be stored in the augmentation table 312.
- Message duration parameter 1314: parameter value indicating, in seconds, the amount of time for which content of the message (e.g., the message image payload 1306, message video payload 1308, message audio payload 1310) is to be presented or made accessible to a user via the interaction client 104.
- Message geolocation parameter 1316: geolocation data (e.g., latitudinal and longitudinal coordinates) associated with the content payload of the message. Multiple message geolocation parameter 1316 values may be included in the payload, each of these parameter values being associated with respect to content items included in the content (e.g., a specific image within the message image payload 1306, or a specific video in the message video payload 1308).
- Message story identifier 1318: identifier values identifying one or more content collections (e.g., "stories" identified in the collections table 318) with which a particular content item in the message image payload 1306 of the message 1300 is associated. For example, multiple images within the message image payload 1306 may each be associated with multiple content collections using identifier values.
- Message tag 1320: each message 1300 may be tagged with multiple tags, each of which is indicative of the subject matter of content included in the message payload. For example, where a particular image included in the message image payload 1306 depicts an animal (e.g., a lion), a tag value may be included within the message tag 1320 that is indicative of the relevant animal. Tag values may be generated manually, based on user input, or may be automatically generated using, for example, image recognition.
- Message sender identifier 1322: an identifier (e.g., a messaging system identifier, email address, or device identifier) indicative of a user of the user system 102 on which the message 1300 was generated and from which the message 1300 was sent.
- Message receiver identifier 1324: an identifier (e.g., a messaging system identifier, email address, or device identifier) indicative of a user of the user system 102 to which the message 1300 is addressed.

The contents (e.g., values) of the various components of message 1300 may be pointers to locations in tables within which content data values are stored. For example, an image value in the message image payload 1306 may be a pointer to (or address of) a location within an image table 316. Similarly, values within the message video payload 1308 may point to data stored within an image table 316, values stored within the message augmentation data 1312 may point to data stored in an augmentation table 312, values stored within the message story identifier 1318 may point to data stored in a collections table 318, and values stored within the message sender identifier 1322 and the message receiver identifier 1324 may point to user records stored within an entity table 308.

System with Head-Wearable Apparatus

Figure 14:
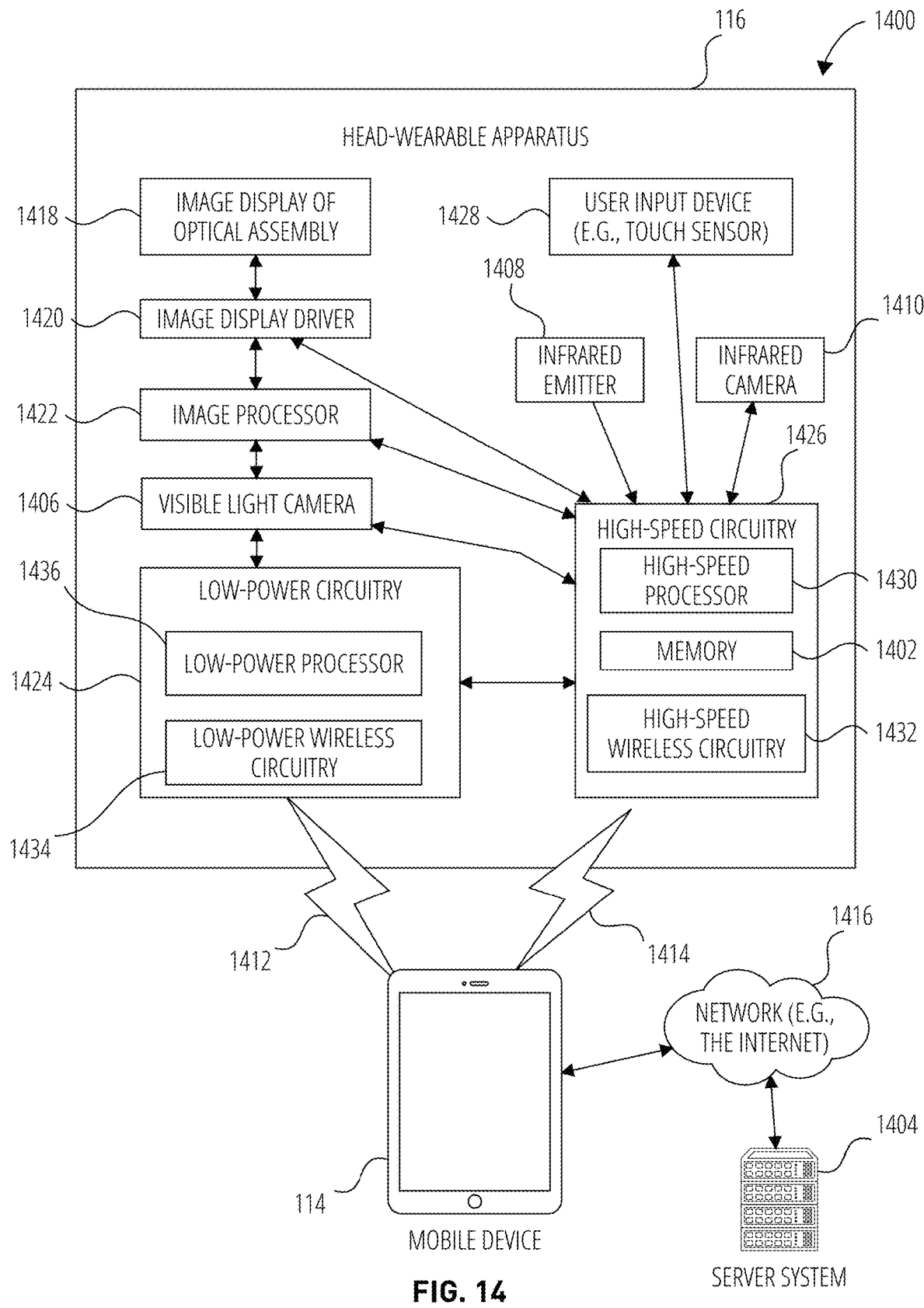
FIG. 14 illustrates a system including a head-wearable apparatus, according to some examples.

FIG. 14 illustrates a system 1400 including a head-wearable apparatus 116, according to some examples. FIG. 14 is a high-level functional block diagram of an example head-wearable apparatus 116 communicatively coupled to a mobile device 114 and various server systems 1404 (e.g., the interaction server system 110) via various networks 108.

The head-wearable apparatus 116 includes one or more cameras, each of which may be, for example, a visible light camera 1406, an infrared emitter 1408, and an infrared camera 1410.

The mobile device 114 connects with head-wearable apparatus 116 using both a low-power wireless connection 1412 and a high-speed wireless connection 1414. The mobile device 114 is also connected to the server system 1404 and the network 1416.

The head-wearable apparatus 116 further includes two image displays of the image display of optical assembly 1418. The two image displays of optical assembly 1418 include one associated with the left lateral side and one associated with the right lateral side of the head-wearable apparatus 116. The head-wearable apparatus 116 also includes an image display driver 1420, an image processor 1422, low-power circuitry 1424, and high-speed circuitry 1426. The image display of optical assembly 1418 is for presenting images and videos, including an image that can include a graphical user interface to a user of the head-wearable apparatus 116.

The image display driver 1420 commands and controls the image display of optical assembly 1418. The image display driver 1420 may deliver image data directly to the image display of optical assembly 1418 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1428 (e.g., touch sensor or push button), including an input surface on the head-wearable apparatus 116. The user input device 1428 (e.g., touch sensor or push button) is to receive from the user an input selection to manipulate the graphical user interface of the presented image.

The components shown in FIG. 14 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1406 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1402, which stores instructions to perform a subset or all of the functions described herein. The memory 1402 can also include a storage device.

As shown in FIG. 14, the high-speed circuitry 1426 includes a high-speed processor 1430, a memory 1402, and high-speed wireless circuitry 1432. In some examples, the image display driver 1420 is coupled to the high-speed circuitry 1426 and operated by the high-speed processor 1430 in order to drive the left and right image displays of the image display of optical assembly 1418. The high-speed processor 1430 may be any processor capable of managing high-speed communications and operation of any general computing system needed for the head-wearable apparatus 116. The high-speed processor 1430 includes processing resources needed for managing high-speed data transfers on a high-speed wireless connection 1414 to a wireless local area network (WLAN) using the high-speed wireless circuitry 1432. In certain examples, the high-speed processor 1430 executes an operating system such as a LINUX operating system or other such operating system of the head-wearable apparatus 116, and the operating system is stored in the memory 1402 for execution. In addition to any other responsibilities, the high-speed processor 1430 executing a software architecture for the head-wearable apparatus 116 is used to manage data transfers with high-speed wireless circuitry 1432. In certain examples, the high-speed wireless circuitry 1432 is configured to implement Institute of Electrical and Electronic Engineers (IEEE) 802.11 communication standards, also referred to herein as Wi-Fi®. In some examples, other high-speed communications standards may be implemented by the high-speed wireless circuitry 1432.

The low-power wireless circuitry 1434 and the high-speed wireless circuitry 1432 of the head-wearable apparatus 116 can include short-range transceivers (Bluetooth™) and wireless wide, local, or wide area network transceivers (e.g., cellular or Wi-Fi®). Mobile device 114, including the transceivers communicating via the low-power wireless connection 1412 and the high-speed wireless connection 1414, may be implemented using details of the architecture of the head-wearable apparatus 116, as can other elements of the network 1416.

The memory 1402 includes any storage device capable of storing various data and applications, including, among other things, camera data generated by the left and right visible light cameras 1406, the infrared camera 1410, and the image processor 1422, as well as images generated for display by the image display driver 1420 on the image displays of the image display of optical assembly 1418. While the memory 1402 is shown as integrated with high-speed circuitry 1426, in some examples, the memory 1402 may be an independent standalone element of the head-wearable apparatus 116. In certain such examples, electrical routing lines may provide a connection through a chip that includes the high-speed processor 1430 from the image processor 1422 or the low-power processor 1436 to the memory 1402. In some examples, the high-speed processor 1430 may manage addressing of the memory 1402 such that the low-power processor 1436 will boot the high-speed processor 1430 any time that a read or write operation involving memory 1402 is needed.

As shown in FIG. 14, the low-power processor 1436 or high-speed processor 1430 of the head-wearable apparatus 116 can be coupled to the camera (visible light camera 1406, infrared emitter 1408, or infrared camera 1410), the image display driver 1420, the user input device 1428 (e.g., touch sensor or push button), and the memory 1402.

The head-wearable apparatus 116 is connected to a host computer. For example, the head-wearable apparatus 116 is paired with the mobile device 114 via the high-speed wireless connection 1414 or connected to the server system 1404 via the network 1416. The server system 1404 may be one or more computing devices as part of a service or network computing system, for example, that includes a processor, a memory, and network communication interface to communicate over the network 1416 with the mobile device 114 and the head-wearable apparatus 116.

The mobile device 114 includes a processor and a network communication interface coupled to the processor. The network communication interface allows for communication over the network 1416, low-power wireless connection 1412, or high-speed wireless connection 1414. Mobile device 114 can further store at least portions of the instructions in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1420. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1404, such as the user input device 1428, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies include:
Electroencephalography (EEG) based BMIs, which record electrical activity in the brain using electrodes placed on the scalp.
Invasive BMIs, which use electrodes that are surgically implanted into the brain.
Optogenetics BMIs, which use light to control the activity of specific nerve cells in the brain.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a GPS receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1412 and high-speed wireless connection 1414 from the mobile device 114 via the low-power wireless circuitry 1434 or high-speed wireless circuitry 1432.

Figure 15:
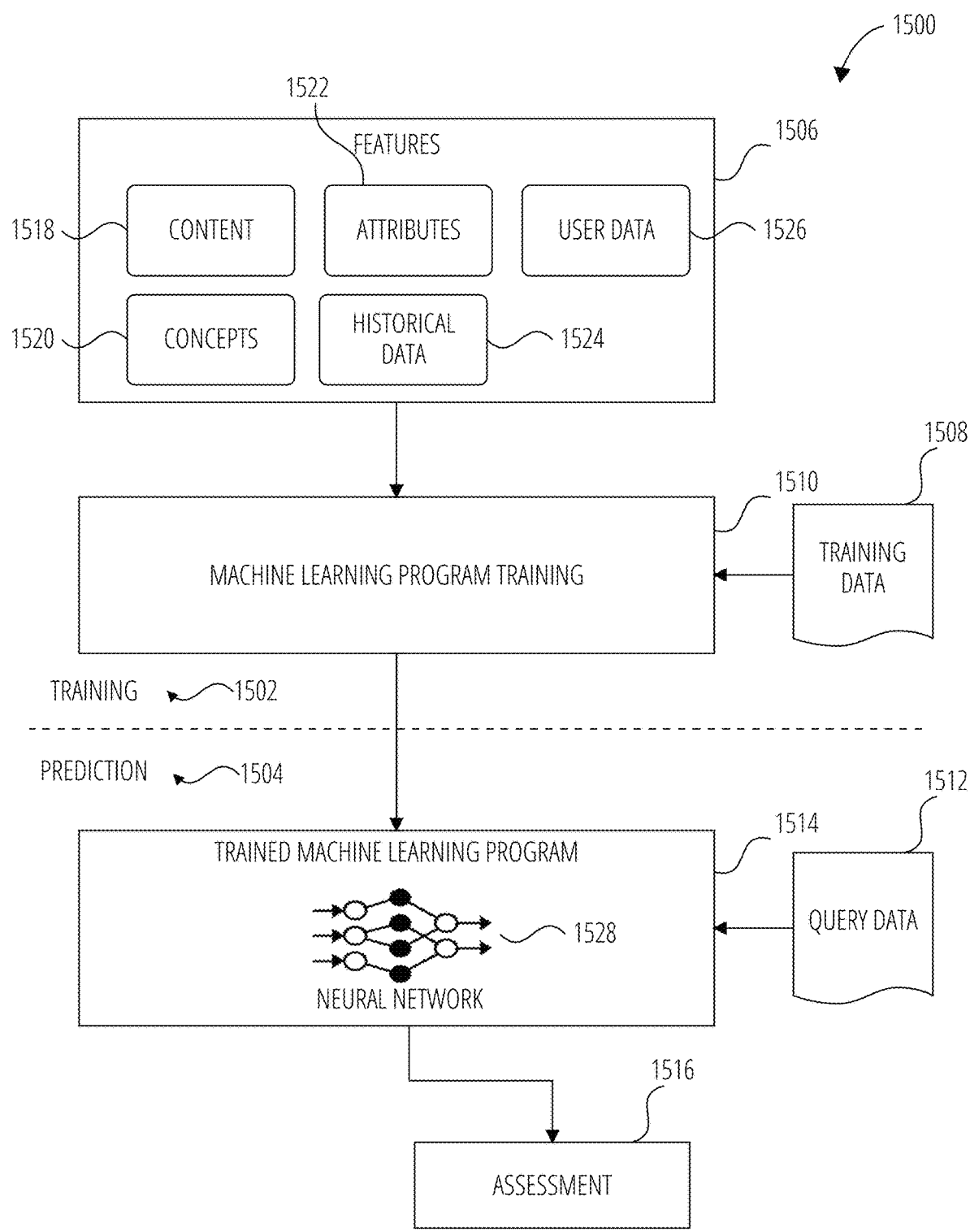
FIG. 15 is a diagram illustrating training and use of a machine learning program, according to some examples.

FIG. 15 is a block diagram generally illustrating a machine learning program 1500, according to some examples. Machine learning programs, also referred to as machine learning algorithms or tools, may be used as part of the techniques and systems described herein.

Machine learning explores the study and construction of algorithms, also referred to herein as tools, that may learn from or be trained using existing data and make predictions about or based on new data. Such machine learning tools operate by building a model from training data 1508 in order to make data-driven predictions or decisions expressed as outputs or assessments (e.g., assessment 1516). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), matrix factorization, and Support Vector Machines (SVM) tools may be used. Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 1500 supports two types of phases, namely training phases 1502 and prediction phases 1504. In training phases 1502, supervised learning, unsupervised or reinforcement learning may be used. For example, the machine learning program 1500 (1) receives features 1506 (e.g., as structured or labeled data in supervised learning) and/or (2) identifies features 1506 (e.g., unstructured or unlabeled data for unsupervised learning) in training data 1508. In prediction phases 1504, the machine learning program 1500 uses the features 1506 for analyzing query data 1512 to generate outcomes or predictions, as examples of an assessment 1516 (this phase is also referred to as inference).

In a training phase 1502, feature engineering may be used to identify features 1506 and may include identifying informative, discriminating, and independent features for the effective operation of the machine learning program 1500 in pattern recognition, classification, and regression. In some examples, the training data 1508 includes labeled data, which is known data for pre-identified features 1506 and one or more outcomes. Each of the features 1506 may be a variable or attribute, such as individual measurable property of a process, article, system, or phenomenon represented by a data set (e.g., the training data 1508). Features 1506 may also be of different types, such as numeric features, strings, and graphs, and may include one or more of content 1518, concepts 1520, attributes 1522, historical data 1524 and/or user data 1526, merely for example.

The concept of a feature in this context is related to that of an explanatory variable used in statistical techniques such as linear regression. Choosing informative, discriminating, and independent features is important for the effective operation of the machine learning program 1500 in pattern recognition, classification, and regression. Features may be of different types, such as numeric features, strings, and graphs.

In training phases 1502, the machine learning program 1500 uses the training data 1508 to find correlations among the features 1506 that affect a predicted outcome or assessment 1516. With the training data 1508 and the identified features 1506, the machine learning program 1500 is trained during the training phase 1502 at machine learning program training 1510. The machine learning program 1500 appraises values of the features 1506 as they correlate to the training data 1508. The result of the training is the trained machine learning program 1514 (e.g., a trained or learned model).

Further, the training phases 1502 may involve machine learning, in which the training data 1508 is structured (e.g., labeled during preprocessing operations), and the trained machine learning program 1514 implements a relatively simple neural network 1528 capable of performing, for example, classification and clustering operations. In other examples, the training phase 1502 may involve deep learning, in which the training data 1508 is unstructured, and the trained machine learning program 1514 implements a deep neural network 1528 that is able to perform both feature extraction and classification/clustering operations.

A neural network 1528 generated during the training phase 1502, and implemented within the trained machine learning program 1514, may include a hierarchical (e.g., layered) organization of neurons. For example, neurons (or nodes) may be arranged hierarchically into a number of layers, including an input layer, an output layer, and multiple hidden layers. Each of the layers within the neural network 1528 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 1528 may also be one of a number of different types of neural networks, including a single-layer feed-forward network, an Artificial Neural Network (ANN), a Recurrent Neural Network (RNN), a transformer network, a symmetrically connected neural network, an unsupervised pre-trained network, a Convolutional Neural Network (CNN), or a Recursive Neural Network (RNN), merely for example.

During prediction phases 1504, or inference, the trained machine learning program 1514 is used to perform an assessment. Query data 1512 is provided as an input to the trained machine learning program 1514, and the trained machine learning program 1514 generates the assessment 1516 as output, responsive to receipt of the query data 1512.

Machine Architecture

Figure 16:
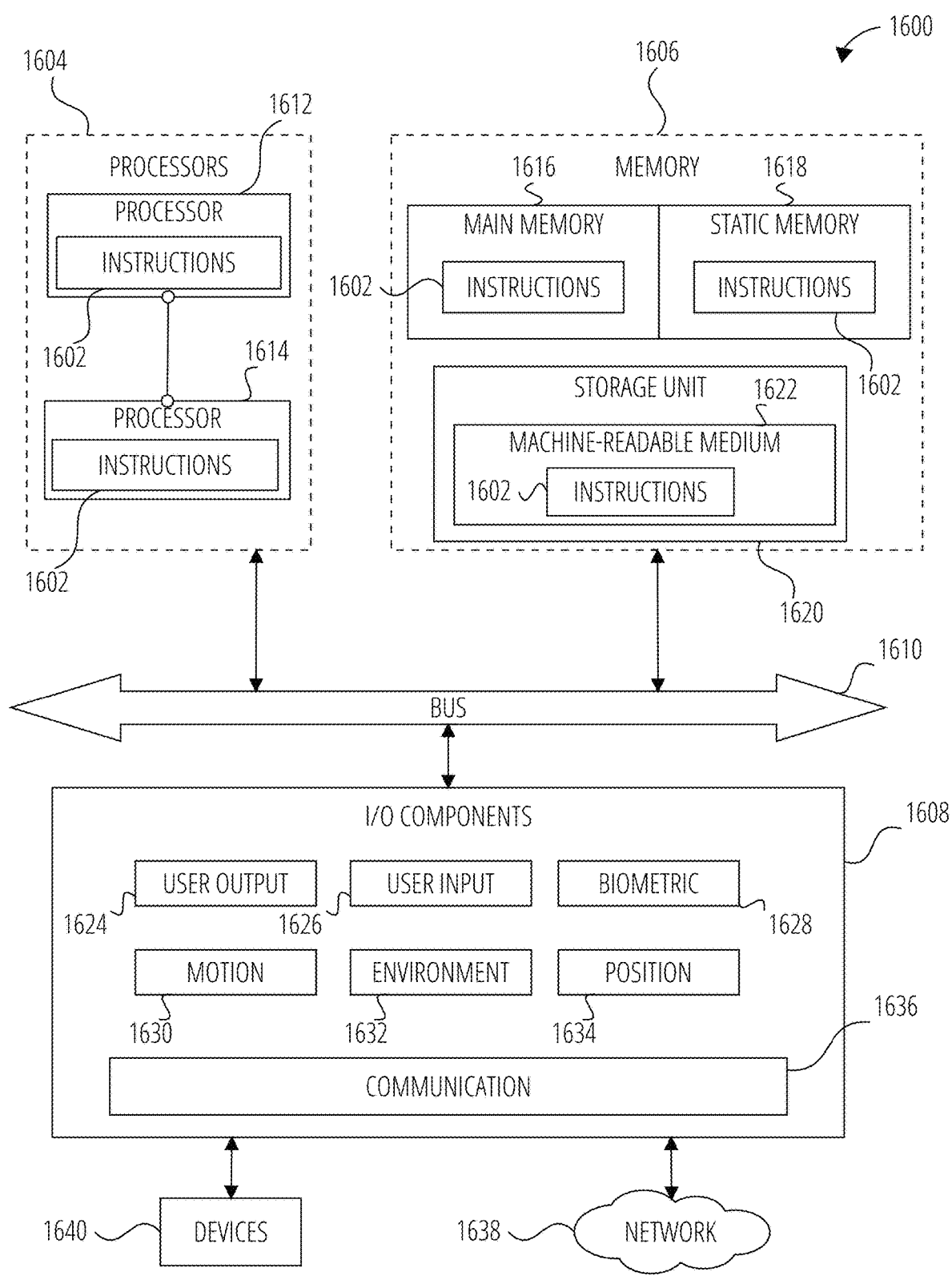
FIG. 16 is a diagrammatic representation of a machine in the form of a computer system within which a set of instructions may be executed to cause the machine to perform any one or more of the methodologies discussed herein, according to some examples.

FIG. 16 is a diagrammatic representation of the machine 1600 within which instructions 1602 (e.g., software, a program, an application, an applet, an app, or other executable code) for causing the machine 1600 to perform any one or more of the methodologies discussed herein may be executed. For example, the instructions 1602 may cause the machine 1600 to execute any one or more of the methods described herein. The instructions 1602 transform the general, non-programmed machine 1600 into a particular machine 1600 programmed to carry out the described and illustrated functions in the manner described. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1602, sequentially or otherwise, that specify actions to be taken by the machine 1600. Further, while a single machine 1600 is illustrated, the term "machine" shall also be taken to include a collection of machines that individually or jointly execute the instructions 1602 to perform any one or more of the methodologies discussed herein. The machine 1600, for example, may comprise the user system 102 or any one of multiple server devices forming part of the interaction server system 110. In some examples, the machine 1600 may also comprise both client and server systems, with certain operations of a particular method or algorithm being performed on the server-side and with certain operations of the particular method or algorithm being performed on the client-side.

The machine 1600 may include processors 1604, memory 1606, and input/output I/O components 1608, which may be configured to communicate with each other via a bus 1610. In an example, the processors 1604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1612 and a processor 1614 that execute the instructions 1602. The term "processor" is intended to include multi-core processors that may comprise two or more independent processors (sometimes referred to as "cores") that may execute instructions contemporaneously. Although FIG. 16 shows multiple processors 1604, the machine 1600 may include a single processor with a single-core, a single processor with multiple cores (e.g., a multi-core processor), multiple processors with a single core, multiple processors with multiples cores, or any combination thereof.

The memory 1606 includes a main memory 1616, a static memory 1618, and a storage unit 1620, both accessible to the processors 1604 via the bus 1610. The main memory 1606, the static memory 1618, and storage unit 1620 store the instructions 1602 embodying any one or more of the methodologies or functions described herein. The instructions 1602 may also reside, completely or partially, within the main memory 1616, within the static memory 1618, within machine-readable medium 1622 within the storage unit 1620, within at least one of the processors 1604 (e.g., within the processor's cache memory), or any suitable combination thereof, during execution thereof by the machine 1600.

The I/O components 1608 may include a wide variety of components to receive input, provide output, produce output, transmit information, exchange information, capture measurements, and so on. The specific I/O components 1608 that are included in a particular machine will depend on the type of machine. For example, portable machines such as mobile phones may include a touch input device or other such input mechanisms, while a headless server machine will likely not include such a touch input device. It will be appreciated that the I/O components 1608 may include many other components that are not shown in FIG. 16. In various examples, the I/O components 1608 may include user output components 1624 and user input components 1626. The user output components 1624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1608 may include biometric components 1628, motion components 1630, environmental components 1632, or position components 1634, among a wide array of other components. For example, the biometric components 1628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 1630 include acceleration sensor components (e.g., accelerometer), gravitation sensor components, rotation sensor components (e.g., gyroscope).

The environmental components 1632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 3600 camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple camera systems may include a wide camera, an ultra-wide camera, a telephoto camera, a macro camera, and a depth sensor, for example.

The position components 1634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1608 further include communication components 1636 operable to couple the machine 1600 to a network 1638 or devices 1640 via respective coupling or connections. For example, the communication components 1636 may include a network interface component or another suitable device to interface with the network 1638. In further examples, the communication components 1636 may include wired communication components, wireless communication components, cellular communication components, Near Field Communication (NFC) components, Bluetooth™ components (e.g., Bluetooth™ Low Energy), Wi-Fi components, and other communication components to provide communication via other modalities. The devices 1640 may be another machine or any of a wide variety of peripheral devices (e.g., a peripheral device coupled via a USB).

Moreover, the communication components 1636 may detect identifiers or include components operable to detect identifiers. For example, the communication components 1636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1636, such as location via Internet Protocol (IP) geolocation, location via Wi-Fi® signal triangulation, location via detecting an NFC beacon signal that may indicate a particular location, and so forth.

The various memories (e.g., main memory 1616, static memory 1618, and memory of the processors 1604) and storage unit 1620 may store one or more sets of instructions and data structures (e.g., software) embodying or used by any one or more of the methodologies or functions described herein. These instructions (e.g., the instructions 1602), when executed by processors 1604, cause various operations to implement the disclosed examples.

The instructions 1602 may be transmitted or received over the network 1638, using a transmission medium, via a network interface device (e.g., a network interface component included in the communication components 1636) and using any one of several well-known transfer protocols (e.g., hypertext transfer protocol (HTTP)). Similarly, the instructions 1602 may be transmitted or received using a transmission medium via a coupling (e.g., a peer-to-peer coupling) to the devices 1640.

Software Architecture

Figure 17:
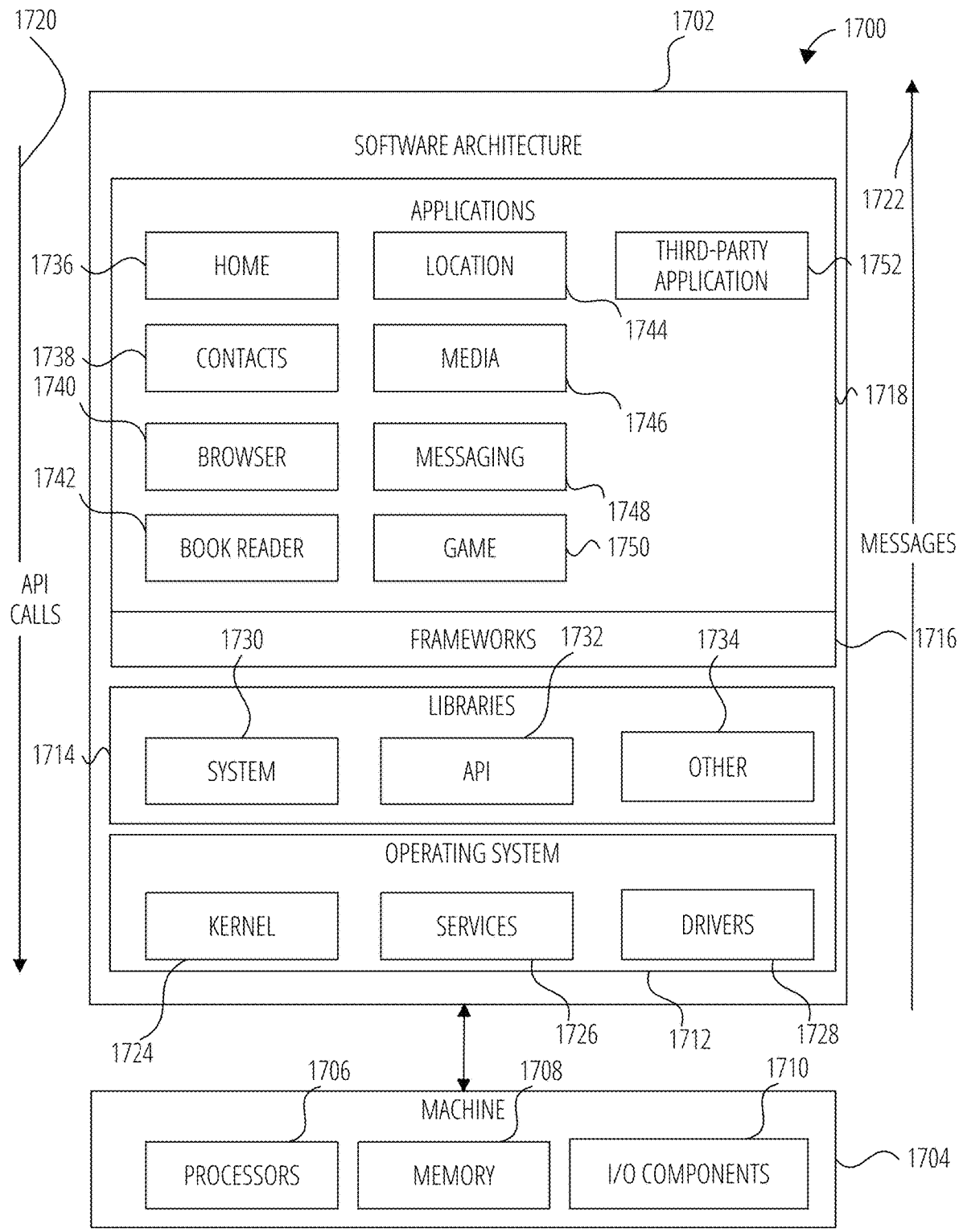
FIG. 17 is a block diagram showing a software architecture within which examples may be implemented.

FIG. 17 is a block diagram 1700 illustrating a software architecture 1702, which can be installed on any one or more of the devices described herein. The software architecture 1702 is supported by hardware such as a machine 1704 that includes processors 1706, memory 1708, and I/O components 1710. In this example, the software architecture 1702 can be conceptualized as a stack of layers, where each layer provides a particular functionality. The software architecture 1702 includes layers such as an operating system 1712, libraries 1714, frameworks 1716, and applications 1718. Operationally, the applications 1718 invoke API calls 1720 through the software stack and receive messages 1722 in response to the API calls 1720.

The operating system 1712 manages hardware resources and provides common services. The operating system 1712 includes, for example, a kernel 1724, services 1726, and drivers 1728. The kernel 1724 acts as an abstraction layer between the hardware and the other software layers. For example, the kernel 1724 provides memory management, processor management (e.g., scheduling), component management, networking, and security settings, among other functionalities. The services 1726 can provide other common services for the other software layers. The drivers 1728 are responsible for controlling or interfacing with the underlying hardware. For instance, the drivers 1728 can include display drivers, camera drivers, Bluetooth™ or Bluetooth™ Low Energy drivers, flash memory drivers, serial communication drivers (e.g., USB drivers), WI-FI drivers, audio drivers, power management drivers, and so forth.

The libraries 1714 provide a common low-level infrastructure used by the applications 1718. The libraries 1714 can include system libraries 1730 (e.g., C standard library) that provide functions such as memory allocation functions, string manipulation functions, mathematic functions, and the like. In addition, the libraries 1714 can include API libraries 1732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1714 can also include a wide variety of other libraries 1734 to provide many other APIs to the applications 1718.

The frameworks 1716 provide a common high-level infrastructure that is used by the applications 1718. For example, the frameworks 1716 provide various graphical user interface (GUI) functions, high-level resource management, and high-level location services. The frameworks 1716 can provide a broad spectrum of other APIs that can be used by the applications 1718, some of which may be specific to a particular operating system or platform.

In an example, the applications 1718 may include a home application 1736, a contacts application 1738, a browser application 1740, a book reader application 1742, a location application 1744, a media application 1746, a messaging application 1748, a game application 1750, and a broad assortment of other applications such as a third-party application 1752. The applications 1718 are programs that execute functions defined in the programs. Various programming languages can be employed to create one or more of the applications 1718, structured in a variety of manners, such as object-oriented programming languages (e.g., Objective-C, Java, or C++) or procedural programming languages (e.g., C or assembly language). In a specific example, the third-party application 1752 (e.g., an application developed using the ANDROID™ or JOS™ SDK by an entity other than the vendor of the particular platform) may be mobile software running on a mobile operating system such as IOS™, ANDROID™, WINDOWS® Phone, or another mobile operating system. In this example, the third-party application 1752 can invoke the API calls 1720 provided by the operating system 1712 to facilitate functionalities described herein.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; and at least one memory component storing instructions that, when executed by the at least one processor, cause the at least one processor to perform operations comprising: detecting message content; identifying a set of candidate stickers based on the message content; and dynamically replacing a search icon with a representation of respective ones of the set of candidate stickers, such that at a first point in time the search icon represents a first candidate sticker of the set of candidate stickers and at a second point in time the search icon represents a second candidate sticker of the set of candidate stickers.

In Example 2, the subject matter of Example 1 includes, wherein respective candidate stickers from the set of candidate stickers are each presented as the search icon, one after another, and each for a predetermined period of time.

In Example 3, the subject matter of Examples 1-2 includes, the operations further comprising: causing presentation of a messaging interface of an interaction application, the messaging interface including the search icon, and wherein the messaging interface enables exchanging of messages between a sending user and at least one receiving user.

In Example 4, the subject matter of Example 3 includes, wherein the detection of the message content comprises detecting addition of the message content to an input field of the messaging interface.

In Example 5, the subject matter of Examples 3-4 includes, the operations further comprising: receiving user input to select the search icon within the messaging interface; and responsive to receiving the user input to select the search icon, causing presentation, within the messaging interface, of a sticker search graphical element that presents one or more of the candidate stickers, each of the one or more candidate stickers presented by the sticker search graphical element being user selectable to include the candidate sticker in a message.

In Example 6, the subject matter of Example 5 includes, wherein the message is a second message, and wherein the detection of the message content comprises detecting transmission of a first message comprising the message content, via the messaging interface, from the sending user to the at least one receiving user.

In Example 7, the subject matter of Examples 5-6 includes, the operations further comprising: responsive to receiving the user input to select the search icon, ceasing the dynamic replacement of the search icon.

In Example 8, the subject matter of Examples 1-7 includes, wherein the message content comprises text content.

In Example 9, the subject matter of Example 8 includes, wherein the identification of the set of candidate stickers comprises: performing an automatic sticker search using the text content; and determining, based on a result of the automatic sticker search, the set of candidate stickers.

In Example 10, the subject matter of Example 9 includes, wherein the set of candidate stickers is a subset of stickers supported by an interaction application, each sticker supported by the interaction application being stored in association with sticker metadata such that each candidate sticker is determinable, during the automatic sticker search, based on relevance of the sticker metadata of the candidate sticker to the text content.

In Example 11, the subject matter of Examples 1-10 includes, wherein the identification of the set of candidate stickers comprises defining a sequence in which the respective candidate stickers are to be presented as the search icon, and wherein the dynamic replacement of the search icon comprises dynamically updating the search icon according to the sequence.

In Example 12, the subject matter of Example 11 includes, wherein each candidate sticker has a sticker category, the sequence being defined such that consecutive candidate stickers within the sequence have different sticker categories.

In Example 13, the subject matter of Examples 11-12 includes, the operations further comprising: detecting a predetermined change in the set of candidate stickers; and responsive to detecting the predetermined change in the set of candidate stickers, ceasing the dynamic updating of the search icon according to the sequence.

In Example 14, the subject matter of Examples 5-13 includes, wherein the sticker search graphical element presents the one or more of the candidate stickers in a search results tab.

In Example 15, the subject matter of Example 14 includes, wherein the sticker search graphical element comprises a user-navigable search panel in which the search results tab is presented.

In Example 16, the subject matter of Example 15 includes, wherein the search panel comprises a plurality of other tabs to arrange stickers supported by the interaction application by sticker category.

In Example 17, the subject matter of Examples 5-16 includes, the operations further comprising: receiving user input to select a candidate sticker of the one or more of the candidate stickers presented by the sticker search graphical element within the messaging interface; and responsive to receiving the user input to select the candidate sticker, causing the selected candidate sticker to be included in the message for transmission from the sending user to the at least one receiving user.

In Example 18, the subject matter of Examples 2-17 includes, wherein the predetermined period of time is between one second and five seconds.

Example 19 is a method comprising: detecting message content; identifying a set of candidate stickers based on the message content; and dynamically replacing a search icon with a representation of respective ones of the set of candidate stickers, such that at a first point in time the search icon represents a first candidate sticker of the set of candidate stickers and at a second point in time the search icon represents a second candidate sticker of the set of candidate stickers.

Example 20 is a non-transitory computer-readable storage medium storing instructions that, when executed by at least one processor, cause the at least one processor to perform operations comprising: detecting message content; identifying a set of candidate stickers based on the message content; and dynamically replacing a search icon with a representation of respective ones of the set of candidate stickers, such that at a first point in time the search icon represents a first candidate sticker of the set of candidate stickers and at a second point in time the search icon represents a second candidate sticker of the set of candidate stickers.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

CONCLUSION

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device," refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium" and "signal medium" mean the same thing and may be used interchangeably in this disclosure.

"Sticker" refers, for example, to a type of digital content that may be used to convey emotions, reactions, moods, statements, views, or messages, within a message. While some stickers may be in the form of emojis, stickers are often larger and/or more expressive than regular emojis, and they may feature characters, illustrations, or animations. Stickers can be sent as standalone messages, or they can be added to a message to enhance its meaning or add a playful or creative element to the conversation. Some applications allow users to download and use custom sticker packs, while others offer a selection of built-in stickers. Some applications allow users to create their own custom or personal stickers.

"User device" refers, for example, to a device accessed, controlled, or owned by a user and with which the user interacts to perform an action, or interaction on the user device, including an interaction with other users or computer systems.

What is claimed is:

1. A system comprising:
   at least one processor; and
   at least one memory component storing instructions that, when executed by the at least one processor, cause the at least one processor to perform operations comprising:
      while displaying, in a messaging interface, a generic search icon functioning as a sticker search icon, detecting message content added to an input field of a message composition zone of the messaging interface;
      identifying a set of candidate stickers based on the message content, the set of candidate stickers comprising more than two stickers; and
      automatically cycling through the set of candidate stickers in a timed sequence by replacing, within the messaging interface and while maintaining display of the message composition zone including the message content added to the input field:
         the generic search icon with a representation of a first candidate sticker of the set of candidate stickers functioning as the sticker search icon at a first point in time,
         the representation of the first candidate sticker with a representation of a second candidate sticker of the set of candidate stickers functioning as the sticker search icon at a second point in time according to the timed sequence, and
         the representation of the second candidate sticker with a representation of a third candidate sticker of the set of candidate stickers functioning as the sticker search icon at a third point in time according to the timed sequence.

2. The system of claim 1, the operations further comprising:
causing presentation of the messaging interface, the messaging interface being an interface of an interaction application, and wherein the messaging interface enables exchanging of messages between a sending user and at least one receiving user.

3. The system of claim 2, the operations further comprising:
receiving user input to select a currently presented candidate sticker of the set of candidate stickers that is presented to function as the sticker search icon within the messaging interface; and
responsive to receiving the user input to select the currently presented candidate sticker, causing presentation, within the messaging interface, of a sticker search graphical element that presents one or more candidate stickers from the set of candidate stickers, each of the one or more candidate stickers presented by the sticker search graphical element being user selectable to include the candidate sticker in a message.

4. The system of claim 3, wherein the message is a second message, and wherein the operations further comprise detecting transmission of a first message comprising the message content, via the messaging interface, from the sending user to the at least one receiving user.

5. The system of claim 3, the operations further comprising:
responsive to receiving the user input to select the currently presented candidate sticker, ceasing the automatic cycling through the set of candidate stickers.

6. The system of claim 3, wherein the sticker search graphical element presents the one or more of the candidate stickers in a search results tab.

7. The system of claim 6, wherein the sticker search graphical element comprises a user-navigable search panel in which the search results tab is presented.

8. The system of claim 7, wherein the search panel comprises a plurality of other tabs to arrange stickers supported by the interaction application by sticker category.

9. The system of claim 3, the operations further comprising:
receiving user input to select a candidate sticker of the one or more of the candidate stickers presented by the sticker search graphical element within the messaging interface; and
responsive to receiving the user input to select the candidate sticker, causing the selected candidate sticker to be included in the message for transmission from the sending user to the at least one receiving user.

10. The system of claim 1, wherein the message content comprises text content.

11. The system of claim 1, wherein identifying the set of candidate stickers comprises:
performing an automatic sticker search using text content; and
determining, based on a result of the automatic sticker search, the set of candidate stickers.

12. The system of claim 11, wherein the set of candidate stickers is a subset of stickers supported by an interaction application, each sticker supported by the interaction application being stored in association with sticker metadata such that each candidate sticker is determinable, during the automatic sticker search, based on relevance of the sticker metadata of the candidate sticker to the text content.

13. The system of claim 1, wherein identifying the set of candidate stickers comprises performing a sticker search to define the timed sequence in which the respective candidate stickers are presented so as to function as the sticker search icon.

14. The system of claim 1, wherein each candidate sticker has a sticker category, the timed sequence being defined such that consecutive candidate stickers within the timed sequence have different sticker categories.

15. The system of claim 1, the operations further comprising:
detecting a predetermined change in the set of candidate stickers; and
responsive to detecting the predetermined change in the set of candidate stickers, ceasing the automatic cycling through the set of candidate stickers.

16. The system of claim 1, wherein the timed sequence defines a predetermined time period for which each candidate sticker of the set of candidate stickers is presented so as to function as the sticker search icon, and the predetermined period of time is between one second and five seconds.

17. The system of claim 1, wherein the representation of each respective one of the set of candidate stickers comprises a thumbnail-type representation of the respective one of the set of candidate stickers presented within the messaging interface.

18. A method comprising:
while displaying, in a messaging interface, a generic search icon functioning as a sticker search icon, detecting message content added to an input field of a message composition zone of the messaging interface;
identifying a set of candidate stickers based on the message content, the set of candidate stickers comprising more than two stickers; and
automatically cycling through the set of candidate stickers in a timed sequence by replacing, within the messaging interface and while maintaining display of the message composition zone including the message content added to the input field:
the generic search icon with a representation of a first candidate sticker of the set of candidate stickers functioning as the sticker search icon at a first point in time,
the representation of the first candidate sticker with a representation of a second candidate sticker of the set of candidate stickers functioning as the sticker search icon at a second point in time according to the timed sequence, and
the representation of the second candidate sticker with a representation of a third candidate sticker of the set of candidate stickers functioning as the sticker search icon at a third point in time according to the timed sequence.

19. The method of claim 18, wherein each candidate sticker has a sticker category, the timed sequence being defined such that consecutive candidate stickers within the timed sequence have different sticker categories.

20. A non-transitory computer-readable storage medium storing instructions that, when executed by at least one processor, cause the at least one processor to perform operations comprising:
while displaying, in a messaging interface, a generic search icon functioning as a sticker search icon, detecting message content added to an input field of a message composition zone of the messaging interface;

identifying a set of candidate stickers based on the message content, the set of candidate stickers comprising more than two stickers; and automatically cycling through the set of candidate stickers in a timed sequence by replacing, within the messaging interface and while maintaining display of the message composition zone including the message content added to the input field:
- the generic search icon with a representation of a first candidate sticker of the set of candidate stickers functioning as the sticker search icon at a first point in time,
- the representation of the first candidate sticker with a representation of a second candidate sticker of the set of candidate stickers functioning as the sticker search icon at a second point in time according to the timed sequence, and
- the representation of the second candidate sticker with a representation of a third candidate sticker of the set of candidate stickers functioning as the sticker search icon at a third point in time according to the timed sequence.

\* \* \* \* \*